(12) United States Patent
Horr et al.

(10) Patent No.: US 8,131,288 B2
(45) Date of Patent: Mar. 6, 2012

(54) SEAMLESS TRANSITIONING OF AIR-TO-GROUND TRAFFIC

(75) Inventors: Steven L. Horr, Millersville, MD (US); Jeffrey A. Colburn, Frederick, MD (US)

(73) Assignee: Arinc Incorporated, Annapolis, MD (US)

( * ) Notice: Subject to any disclaimer, the term of this patent is extended or adjusted under 35 U.S.C. 154(b) by 855 days.

(21) Appl. No.: 12/186,759

(22) Filed: Aug. 6, 2008

(65) Prior Publication Data

US 2010/0035607 A1    Feb. 11, 2010

(51) Int. Cl.
*H04W 4/00* (2009.01)
*H04W 36/00* (2009.01)

(52) U.S. Cl. ......................... 455/431; 455/440

(58) Field of Classification Search .......... 455/427–431, 455/436–442, 432.1–432.2, 433
See application file for complete search history.

(56) References Cited

U.S. PATENT DOCUMENTS

| | | | |
|---|---|---|---|
| 7,058,401 B1 * | 6/2006 | Sinivaara et al. ............. | 455/431 |
| 7,751,815 B2 * | 7/2010 | McKenna et al. ............. | 455/431 |
| 7,783,288 B2 * | 8/2010 | Waugh et al. ................. | 455/429 |
| 2004/0180653 A1 * | 9/2004 | Royalty ........................ | 455/431 |
| 2005/0053026 A1 | 3/2005 | Mullan et al. | |
| 2005/0070222 A1 * | 3/2005 | Chapelle et al. ............. | 455/12.1 |
| 2006/0041651 A1 | 2/2006 | Walcutt et al. | |
| 2008/0130539 A1 * | 6/2008 | Lauer et al. ................... | 370/310 |

* cited by examiner

*Primary Examiner* — Brandon Miller
(74) *Attorney, Agent, or Firm* — Ronald E. Prass, Jr.; Prass LLP

(57) ABSTRACT

An apparatus and a method may be provided by which a user aboard an aircraft may use a processing device to communicate with another device, which is not located aboard the aircraft, via an air-to-ground network connection. A communication satellite may provide connectivity for the air-to-ground network connection. As the aircraft approaches an end of a satellite coverage area, the air-to-ground network connection may seamlessly transition to a second communication satellite or a second communication medium. Some communication satellites may communicate via a first frequency range and other communication satellites may communicate via a second frequency range. In one mode of operation, the air-to-ground network connection may be via a communication satellite communicating via a first frequency range. A transition to a communication medium communicating via a second frequency range may occur automatically only during the one mode of operation.

9 Claims, 18 Drawing Sheets

SEAMLESS TRANSITIONING OF AIR-TO-GROUND TRAFFIC

BACKGROUND OF THE INVENTION

1. Field of the Invention

This invention relates generally to transitioning, from a first satellite to another communication medium, or vice versa, of a voice or data connection between a processing device aboard an aircraft and an on-ground processing device. More specifically, the invention relates to a seamless transition, from a first communication satellite to another communication medium, or vice versa, of a voice or data connection from a device aboard an aircraft to an on-ground device. The first satellite may be a communication satellite communicating via a first communication band and the other communication medium may be a second communication satellite communicating via a second communication band, or may be a wireless fidelity (WiFi), a high frequency (HF), an ultra-high frequency (UHF), or other communication medium.

2. Description of Related Art

Data and voice communications between a device aboard an aircraft and a ground-based device may pass through a communication satellite. As the aircraft moves out of range of the communication satellite, a connection between the device aboard the aircraft and the ground-based device may be lost. In many existing air-to-ground data and voice communication systems, a noticeable dark period may occur after which the connection may be reestablished.

In some existing air-to-ground data and voice communication systems, when an aircraft moves out of range of a communication satellite, through which data and voice traffic between a device aboard the aircraft and a ground-based device may pass, a new connection may be established with a second communication satellite in a seamless manner.

Today, data and voice communications from an aircraft to a ground-based device may pass through a communication satellite, which may communicate via Ku band, Ka band, or L band. L-band communication satellites may provide connectivity between a device aboard an aircraft and a ground-based device at a much higher cost than would Ku-band communication satellites. However, a number of deployed Ku-band communication satellites is currently insufficient to continuously guarantee connectivity between a device aboard an aircraft and a ground-based device. When an aircraft moves out of range from a Ku-band communication satellite and no Ku-band communication satellite is available, connectivity may be established via an L-band communication satellite, at much higher cost.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An apparatus and a method are provided for seamlessly maintaining a connection from a first processing device aboard an aircraft to a second processing device via an air-to-ground network connection, regardless of a communication medium employed for seamlessly maintaining the connection.

In an embodiment consistent with the subject matter of this disclosure, a packet satisfying certain criteria may be received, from a first processing device. An aircraft-based subsystem, acting as a proxy for the first processing device, may log onto a ground-based service manager when the first processing device is not logged onto the ground-based service manager, the packet satisfying the certain criteria is received from the first processing device, and the first processing device is not logged onto the ground-based service manager. Traffic from the first processing device may be passed through an air-to-ground network connection to a second processing device when the first processing device is already logged onto the ground-based service manager. As an end of a coverage area of a satellite, which handles the air-to-ground network connection, is approached, the air-to-ground network connection may seamlessly transition from the satellite to a second satellite, or other communication medium.

In some embodiments, the satellite may communicate via Ku-band and the second satellite may communicate via L-band. The seamless transition of the air-to-ground network connection may occur automatically when operating in auto mode. When operating in manual mode, the seamless transition may occur only when a user of the first processing device approves the transition. When operating in manual override mode, the air-to-ground network connection may only be connected via an L-band satellite.

When the air-to-ground network connection from the first processing device to a second remote device has an ongoing Voice Over IP (VoIP) call, the VoIP call may remain open as long as actual VoIP data passes through the VoIP call during predetermined time intervals.

DRAWINGS

In order to describe the manner in which the above-recited and other advantages and features can be obtained, a more particular description is provided below and will be rendered by reference to specific embodiments thereof, which are illustrated in the appended drawings. Understanding that these drawings depict only typical embodiments and are not therefore to be considered to be limiting of its scope, implementations will be described and explained with additional specificity and detail through the use of the accompanying drawings in which.

DETAILED DESCRIPTION

Figure 1:
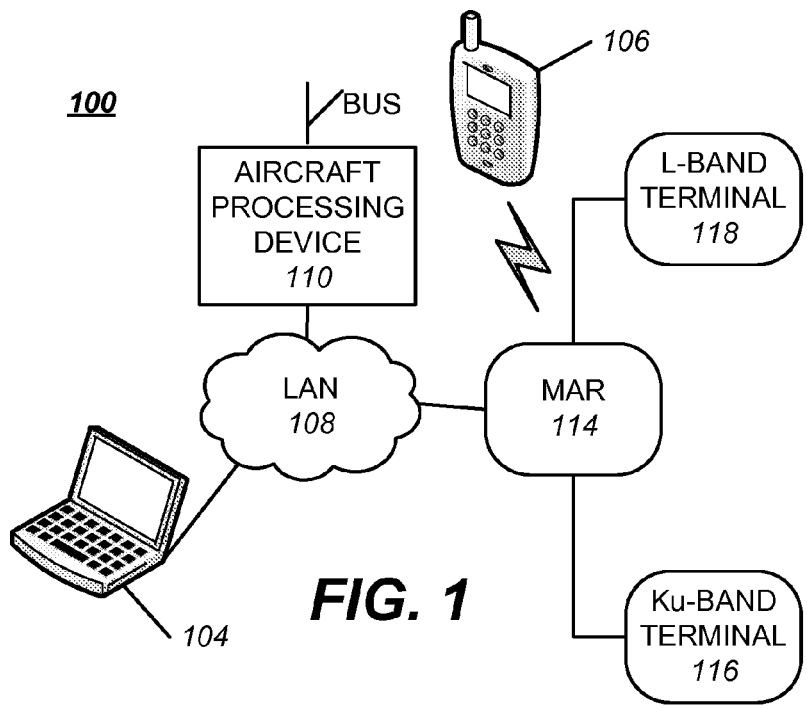
FIG. 1 illustrates an aircraft-based subsystem consistent with the subject matter of this disclosure.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or maybe learned by the practice of the invention as set forth herein.

Various embodiments of the invention are discussed in detail below. While specific implementations are discussed, it should be understood that this is done for illustration purposes only. A person skilled in the relevant art will recognize that other component configurations may be used without parting from the spirit and scope of the invention.

The invention comprises a variety of embodiments, such as a method and processing device and other embodiments that relate to the basic concepts of the invention. Note that while this disclosure discusses aircraft-to-ground communication uses for the invention, the invention by no means is limited to that area and may be applied to a wide variety of environments and uses. For example, uses consistent with the subject matter of this disclosure may include, but not be limited to, aircraft-to-aircraft communication, aircraft-to-land (fixed and mobile) communication, and aircraft-to-sea (fixed and mobile) communication.

Overview

In embodiments consistent with the subject matter of this disclosure, a system and method may be provided by which a user aboard an aircraft may communicate, via a processing device, to a ground-based device. A communication satellite may provide connectivity between a device aboard the aircraft and the ground-based device. When the aircraft approaches a limit of a spot beam of the communication satellite, a connection with the communication satellite may transition to a connection via another communication medium, such as, for example, a second communication satellite, or other communication medium, such that the connectivity between the device aboard the aircraft and the ground-based device continue with little or no interruption.

Communication satellites may communicate via Ku-band or L-band. Ku-band communications may be relatively inexpensive when compared to L-band communications. In some embodiments, connectivity may be established via a Ku-band communication satellite if a Ku-band communication satellite is available. When a Ku-band communication satellite is not available, connectivity may be established via an L-band communication satellite. A user may configure a preference for having connectivity provided via a Ku-band communication satellite, if one is available, and automatically having the connectivity provided via an L-band communication satellite, when a Ku-band communication satellite is not available. This is known as auto mode.

In some embodiments, a user may configure connectivity with a communications satellite via a manual mode. In the manual mode, connectivity may be provided via a Ku-band communication satellite, when one is available. When a Ku-band communication satellite is not available, the user may be prompted regarding whether he or she desires to have connectivity provided via an L-band communication satellite. When the user indicates a desire to have connectivity provided via an L-band communication satellite, when no Ku-band communication satellite is available, the system may provide connectivity via an L-band communication satellite. When the user indicates no desire to have connectivity provided via an L-band communication satellite, when no Ku-band communication satellite is available, connectivity may be lost when no Ku-band communication satellite is available.

When a system, consistent with the subject matter of this disclosure, is operating in a manual mode, a user may indicate a desire to have connectivity provided in a manual override mode. In the manual override mode, various embodiments may attempt to provide connectivity between a device aboard an aircraft and a ground-based device via an L-band communication satellite. After entering the manual override mode, connectivity may continue to be provided via an L-band communication satellite until the manual override mode is disabled, or the system is configured to operate in the auto mode.

Exemplary Aircraft-Based Subsystem

FIG. 1 illustrates an exemplary aircraft-based subsystem 100 in which embodiments consistent with the subject matter of this disclosure may operate.

Aircraft-based subsystem 100 may be located aboard an aircraft and may include one or more user processing devices 102, 104, 106, a local area network (LAN) 108, an aircraft processing device 110, a communication bus 112 connected to aircraft processing device 110, a mobile access router (MAR) 114, an L-band terminal 116 connected to MAR 114, and a Ku-band terminal 116 connected to MAR 114.

User processing devices 104, 106 may include a laptop personal computer (PC) 104, a handheld processing device 106, which may function as a telephone, and/or other processing devices. Some processing devices may be connected to LAN 108 via a cable, and other processing devices may be connected wirelessly via MAR 114.

In various embodiments, data or voice traffic may be sent via a user processing device, such as user processing device 102, 104, to aircraft processing device 110 via LAN 108. Aircraft processing device 110 may forward the data or voice traffic to MAR 114 via LAN 108. MAR 114 which may further forward the data or voice traffic to L-band terminal 118, or Ku-band terminal 116, which may forward the data or voice traffic to a communication satellite. In some embodiments, aircraft processing device 110 may be a single board computer further connected to a bus 112, which may be a 429 bus for receiving information related to a position of the aircraft.

A processing device, such as, for example, user processing device 106, may send data or voice traffic wirelessly to MAR 114. MAR 114 may forward the data or voice traffic to aircraft processing device 110 via LAN 108. After processing the data or voice traffic, aircraft processing device 110 may forward the data or voice traffic to MAR 114, which may further forward the data or voice traffic to L-band terminal 118, or Ku-band terminal 116, which may forward the data or voice traffic to a communication satellite.

Exemplary Processing Device

Figure 2:
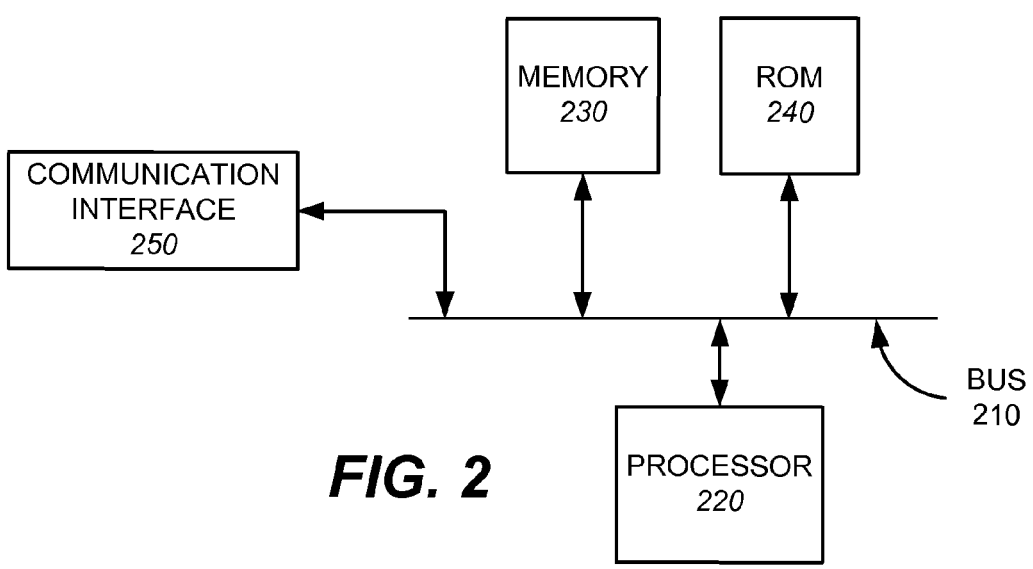
FIG. 2 is a block diagram of a processing device which may be used with embodiments consistent with the subject matter of this disclosure or which may be used to implement embodiments consistent with the subject matter of this disclosure.

FIG. 2 is a functional block diagram that illustrates an exemplary aircraft processing device 110, which may be used to implement embodiments consistent with the subject matter of this disclosure. Aircraft processing device 110 may include a bus 210, a processor 220, a memory 230, a read only memory (ROM) 240, and a communication interface 250. Bus 210 may permit communication among components of aircraft processing device 110.

Communication interface 250 may provide communications to other devices via LAN 108. Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220.

Aircraft processing device 110 may perform such functions in response to processing device 220 executing sequences of instructions contained in a tangible machine-readable medium, such as, for example, memory 230, ROM 240, or other medium.

Figure 3:
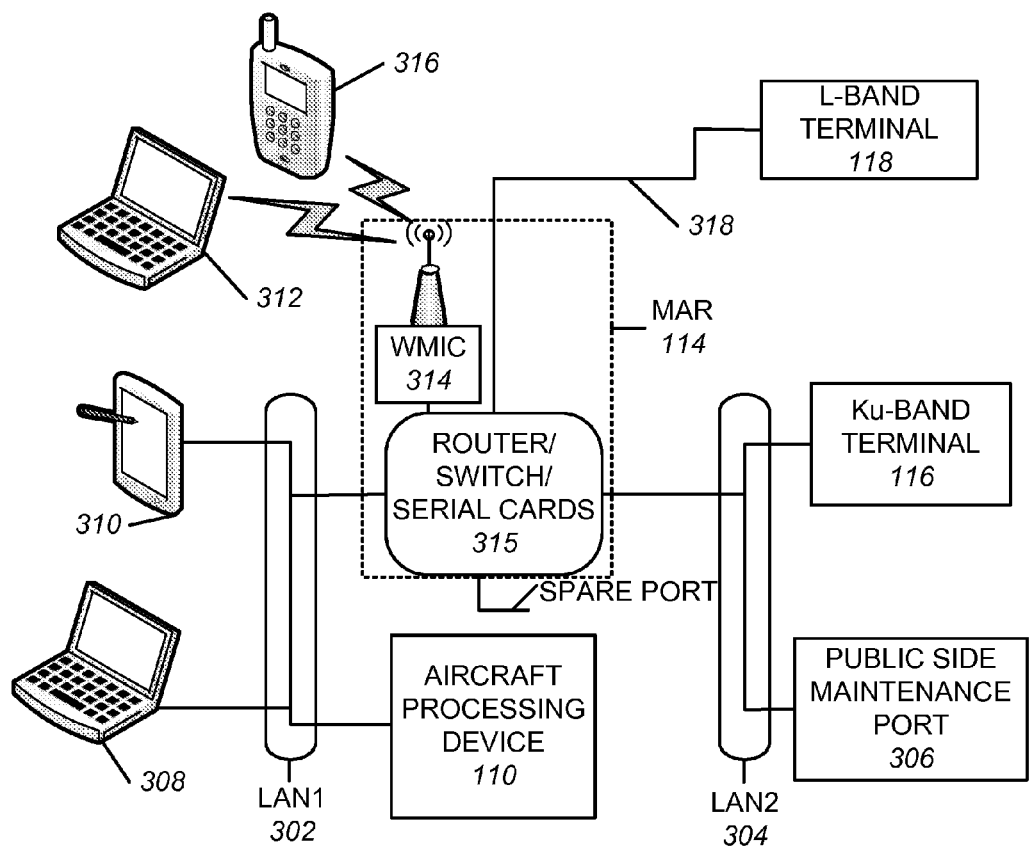
FIG. 3 illustrates a more detailed view of the aircraft-based subsystem shown in FIG. 1.

FIG. 3 is a more detailed view of aircraft subsystem 100. Aircraft subsystem 100 may include LAN1 302, LAN2 304, aircraft processing device 110, MAR 114, L-band terminal 118, Ku-band terminal 116, and a public side maintenance port 306.

User processing devices, such as, for example, a laptop PC 308, a tablet PC 310, or other user processing device may be connected, via a cable, to LAN1 302. Other user processing devices, such as, for example, a laptop PC 312, handheld processing device 316, or other processing device, may connect wirelessly via a wireless mobile interface card (WMIC) 314 to a router or switch 315, which may include serial cards.

Traffic from user processing devices 308, 310 may be received by aircraft processing device 110 and forwarded to router or switch 315. Router or switch 315 may forward the traffic to Ku-band terminal 116, via LAN2 304, or may forward the traffic to L-band terminal 118 via connection 318. In some embodiments, router or switch 315 may forward the traffic to L-band terminal 118 via an integrated services digital network (ISDN), an Ethernet-based network service, or another type of connection.

Traffic from user processing devices 312, 316 may be received by WMIC 314 and forwarded to aircraft processing device 110 via router or switch 315 and LAN1 302. Aircraft processing device 110 may perform processing of the traffic and may forward the traffic to router or switch 315 for further forwarding to Ku-band terminal 116 or L-band terminal 118, as discussed previously.

Incoming traffic may be received by L-band terminal 118 or Ku-band terminal 116 and forwarded to router or switch 315 via ISDN 318 or LAN2 304. Router or switch 315 may forward the incoming traffic to aircraft processing device 100 via LAN1 302. Aircraft processing device 100 may process the incoming traffic and may forward the incoming traffic to one of the user processing devices.

Figure 4:
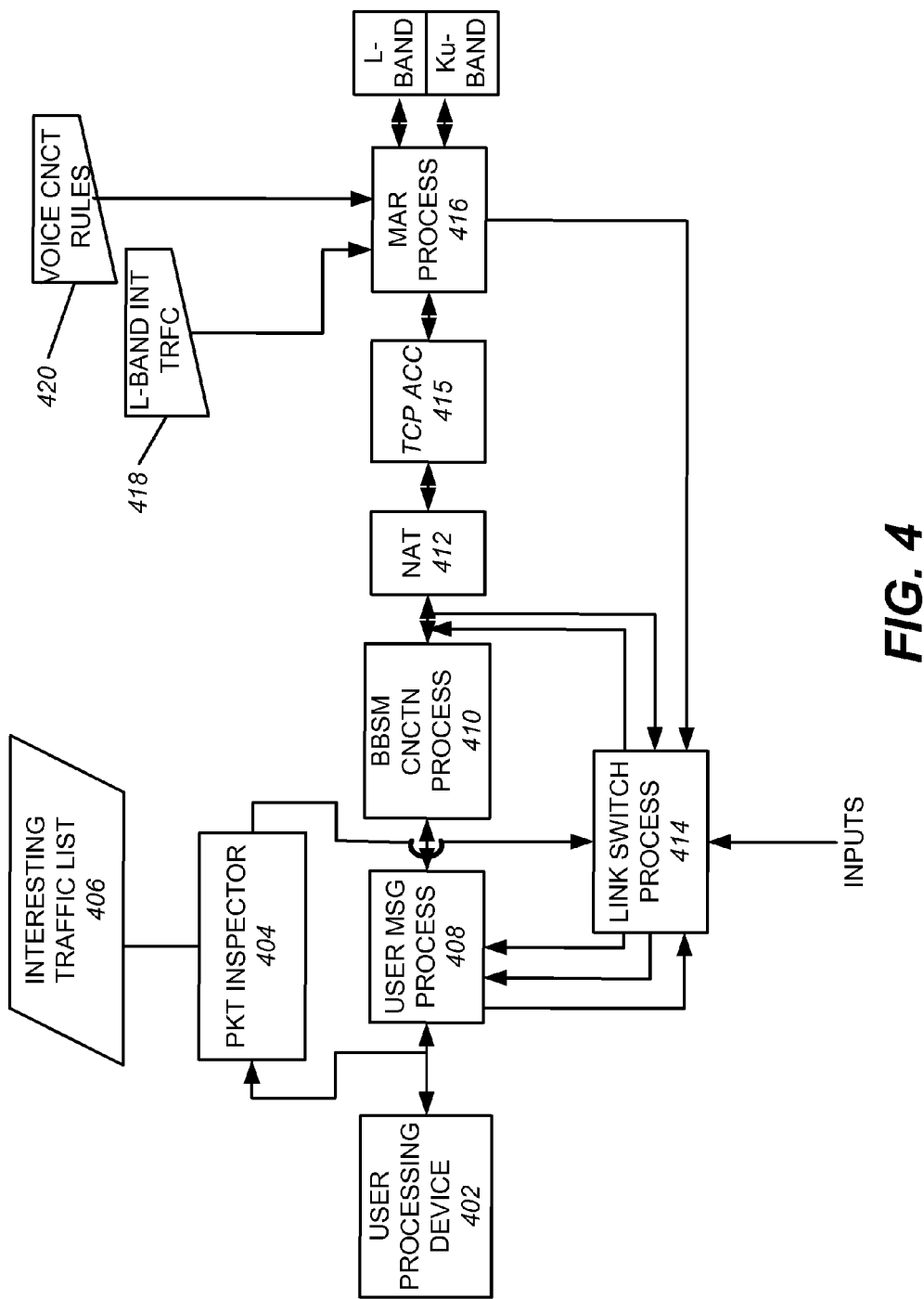
FIG. 4 is a functional block diagram illustrating exemplary processes and functions performed by an aircraft-based subsystem consistent with the subject matter of this disclosure.

FIG. 4 is a functional block diagram illustrating exemplary processes and functions performed by aircraft subsystem 100 in embodiments consistent with the subject matter of this disclosure. A user processing device 402 may provide data or voice traffic, which may be received by packet inspector 404. Packet inspector 404 may inspect the provided data or voice traffic to determine whether the provided data or voice traffic is considered to be interesting traffic, as defined by an interesting traffic list 406. Interesting traffic list 406 may include information defining particular types of packets, or packets having particular source or destination addresses, as interesting traffic. Packet inspector 404 may further inspect each of the provided data packets to determine whether the data packet includes a domain name server (DNS) request.

A user message process 408 may receive an indication from other processes to send a message to a user's processing device. User message process 408 may further receive a response to the sent message. For example, user message process 408 may receive an indication from another process to send a message to the user's processing device informing the user that Ku-connectivity has been lost and asking the user whether the user desires to establish and L-band connection with a ground earth station. User message process 408 may receive a response from the user's processing device and may forward the response to the other process.

Broadband service manager (BBSM) connection process 410 may operate in gateway mode or proxy mode. In gateway mode, BBSM connection process 410 may forward all traffic from LAN1 302 to a terrestrial destination via a ground-based BBSM and may forward all received BBSM messages to the user's processing device. In proxy mode, BBSM connection process 410 may perform a BBSM authentication/logon process for the users processing device and may keep track of a BBSM connection session status.

In proxy mode, NAT 412 may perform network address translation for incoming traffic to an address space assigned to the user's processing device by aircraft processing device 110. In gateway mode, NAT 412 may not perform network address. In some embodiments, NAT 412 may be implemented by aircraft processing device 110.

Link switch process 414 may control a connection path (Ku-band or L-band) for both data and voice traffic. Link switch decisions may be based upon an aircraft position with regard to Ku coverage and quiet regions, default status of a Ku avionics suite, and an agreement to allow Ku-L transition or manual override of Ku connectivity by a user on an aircraft when in manual mode.

A TCP accelerator 415 may use well-known techniques for increasing throughput with respect to an air-to-ground connection.

A MAR process 416 may pass all data traffic forwarded to MAR process 416 by aircraft processing device 110 according to predefined traffic type priority handling rules, as may be defined in a configuration table. While operating in Ku band, MAR process 416 may not inspect or keep track of interesting traffic. While operating in L band, a ping from the address space of aircraft processing device 110 to a ground earth station loopback address may initiate and L-band connection to a terrestrial-based device. MAR process 416 may inspect and keep track of interesting traffic, as may be defined by L-band interesting traffic rules 418, during L-band operations. MAR process 416 may close an L-band connection when no interesting traffic, originating on the aircraft, is detected for a predetermined timer period.

When handling voice over Internet Protocol (VoIP) packets, MAR process 416 may pass all VoIP packets to terrestrially-located VoIP back office servers and gateways when operating in Ku band. MAR process 416 may forward all VoIP packets as long as an L-band connection is valid due to call initiation by aircraft processing device 110, or because a MAR idle timer has not yet expired. When the L-band connection is valid due to call initiation by aircraft processing device 110, or because MAR idle timer has not yet expired. Only actual VoIP packets may be considered interesting and may cause a MAR idle timer to be reset, as may be defined by voice connect rules 420. Command and control packets may not be considered to be interesting by MAR process 416.

Transitioning of Air-to-Ground Connection

Figure 5:
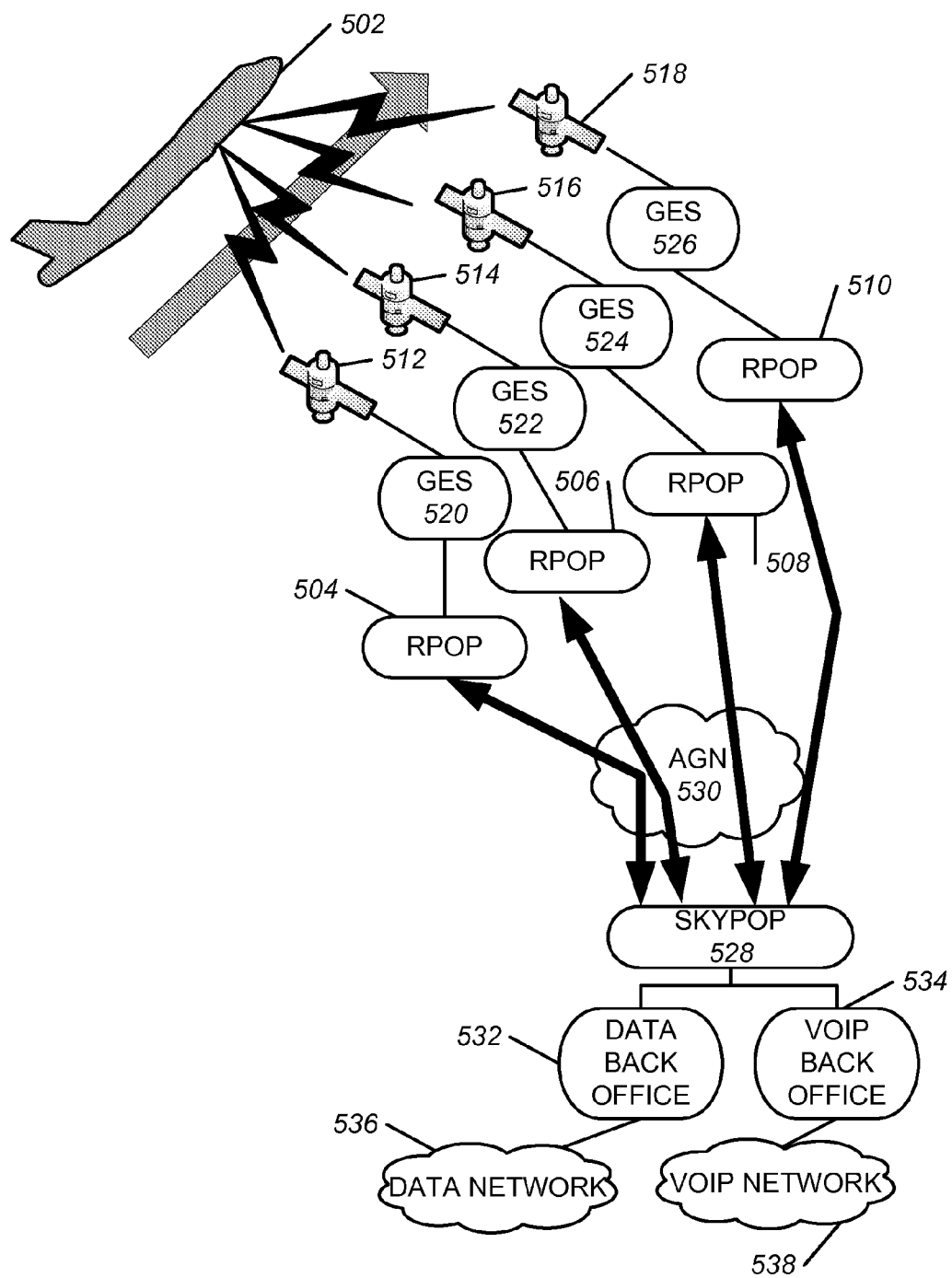
FIG. 5 illustrates a transitioning process by which communications via an air-to-ground connection may seamlessly transition from one communication satellite to another communication satellite, or another communication medium, or vice versa.

FIG. 5 illustrates transitioning of an air-to-ground connection with respect to a moving aircraft. When MAR 114 (FIG. 1), aboard an aircraft 502, is powered on and radio frequency (RF) connectivity is available, MAR 114 may establish a Border Gateway Protocol (BGP) adjacency with any reachable remote point-of-presence (RPOP) 504-510, associated with corresponding ground earth stations (GES). BGP is a routing protocol used to connect autonomous systems, which may be large collections of networks. RPOP 504-510 may be routers.

For example, MAR 114, aboard aircraft 502, may establish a BGP adjacency with RPOP 504 via communication satellite 512 and GES 520. MAR 114 may advertise, over an air-to-ground BGP session, that it is to be used to reach a range of addresses, used by user processing devices aboard aircraft 502. RPOPs 504-510 at all GES 520-526 may have respective BGP connections to a main router, called a SKYPOP 528, via an air-to-ground network (AGN) 530. RPOPs 504-510 may be cross connected via meshed generic routing encapsulation (GRE) tunnels for routing of BGP adjacency information. The route to the range of addresses, advertised by MAR 114, may be forwarded to SKYPOP 528 over a RPOP-to-SKYPOP BGP session. SKYPOP 528 may be centrally located, with respect to RPOPs 504-510 at GESs 520-526, respectively, and may further be connected to a data back office 532 and a VoIP back office 534. A Broadband Service Manager (BBSM) (not shown) may be connected to data back office 532 and VoIP back office 534. Data back office 532 may be connected to a data network 536 for delivery of computer data, video, fax, instant messaging, or other Internet Protocol (IP) packets. VoIP back office 534 may be connected to a VoIP network 538 for delivery of voice traffic to a Public Switched Telephone Network (PSTN) or other network. Data back office 532 and/or VoIP back office 534 may further be employed, in some embodiments, to deliver other types of information, such as, for example, video, fax, instant messaging, or other information, to and from an air-to-ground connection.

As aircraft 502 moves, the air-to-ground BGP session may be lost. When aircraft 502 reestablishes RF connectivity, MAR 114 may reestablish a new BGP adjacency with another RPOP. For example, as aircraft 502 moves, the air-to-ground BGP session via communication satellite 512 may be lost. MAR 114 may reestablish RF connectivity via communication satellite 514 and may reestablish a new BGP adjacency with RPOP 506 via GES 522.

In various embodiments consistent with the subject matter of this disclosure, communication satellites 512-518 may be either Ku-band communication satellites or L-band communication satellites. In other embodiments, communication satellites communicating via other bands may be used. Transitioning from one communication satellite to another works in a same manner regardless of a communication or frequency band used by the communication satellites.

Exemplary Processing

User Message Process

Figure 6:
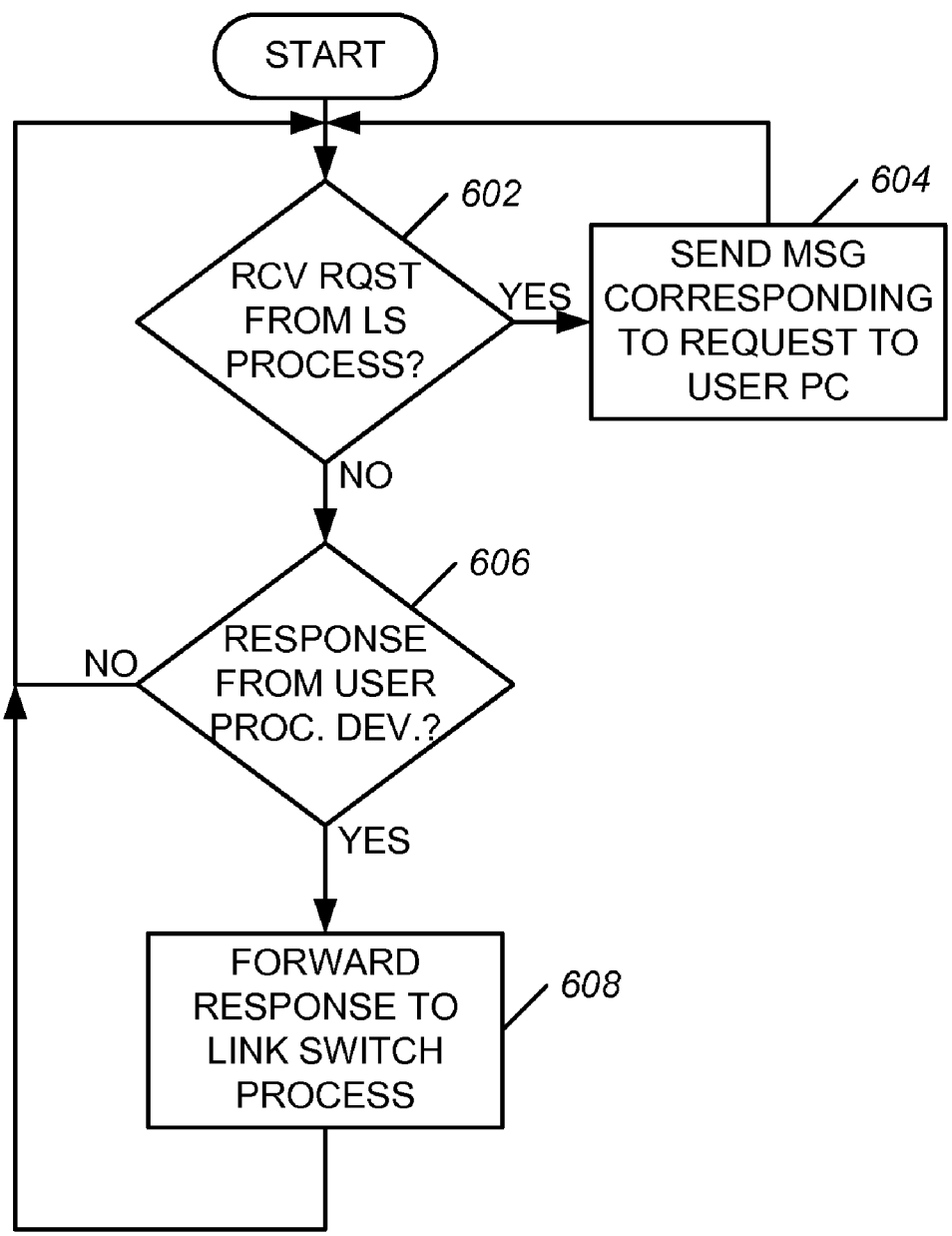
FIG. 6 is a flowchart illustrating exemplary processing with respect to a user message process, in embodiments consistent with the subject matter of this disclosure.

FIG. 6 is a flowchart which illustrates exemplary processing with respect to user message process 408, which may be implemented by aircraft processing device 110. User message process 408 may send a user message to a user processing device on behalf of link switch process 414, and may forward a response from the user processing device to link switch process 414.

The process may begin with user message process 408 determining whether a request is received from link switch process 414 (act 602). If user message process 408 determines that a request is received from link switch process 414, then user message process 408 may send a message associated with the request to a corresponding user processing device (acts 604). Otherwise, user message process 408 may determine whether a response is received from the corresponding user processing device (act 606). If a response is not received from the user processing device, then act 602 may again be performed. Otherwise, user message process 408 may forward the received response to link switch process 414 (act 608).

BBSM connection process 410 may also send messages to the user processing device via user message process 408 and may receive messages from the user processing device.

Packet Inspector

Figure 7:
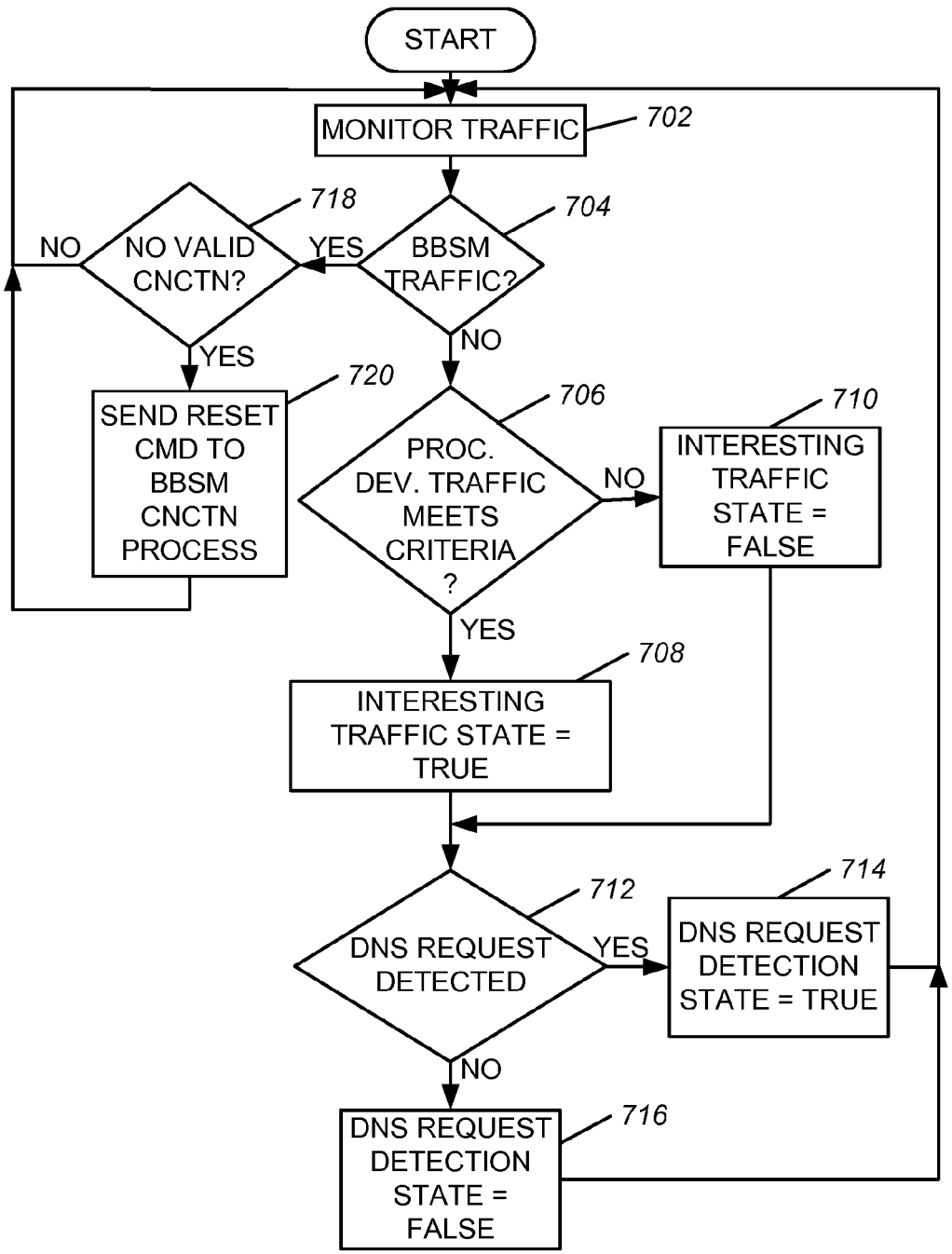
FIG. 7 is a flowchart illustrating exemplary processing with respect to a packet inspector, in embodiments consistent with the subject matter of this disclosure.

FIG. 7 is a flowchart illustrating exemplary processing with respect to packet inspector 404. Packet inspector 404, which may be implemented by aircraft processing device 110, may monitor user processing device traffic on LAN1 302.

The process may begin by monitoring traffic on LAN1 302 (act 702). Packet inspector 404 may then determine whether detected traffic is BBSM traffic (act 704). If the detected traffic is BBSM traffic, then packet inspector 404 may determine whether the BBSM traffic indicates no valid BBSM connection (act 718). If the detected BBSM traffic indicates no valid connection, then a reset command may be sent to BBSM connection process 410 (act 710). Acts 702 and 704 may again be repeated.

If, during act 704, packet inspector 404 determines that the detected traffic is not BBSM traffic, then the detected traffic may be assumed to be traffic from a user processing device. Packet inspector 404 may determine whether the detected user processing device traffic meets certain criteria (act 706). The certain criteria may be predefined criteria with respect to source and/or destination ports, and/or user-entered criteria, which may be entered via a setup menu. If the detected user processing device traffic meets the certain criteria, then an interesting traffic state flag may be set to true (act 708). Otherwise, the interesting traffic state flag may be set to false (act 710).

Packet inspector 404 may then determine whether the detected traffic is a DNS request (act 712). If the detected traffic is determined to be a DNS request, then a DNS request detection state flag may be set to true (act 714). Otherwise, the DNS request detection state flag may be set to false (act 716). Packet inspector 404 may then again perform Act 702.

BBSM Connection Process

Figure 8:
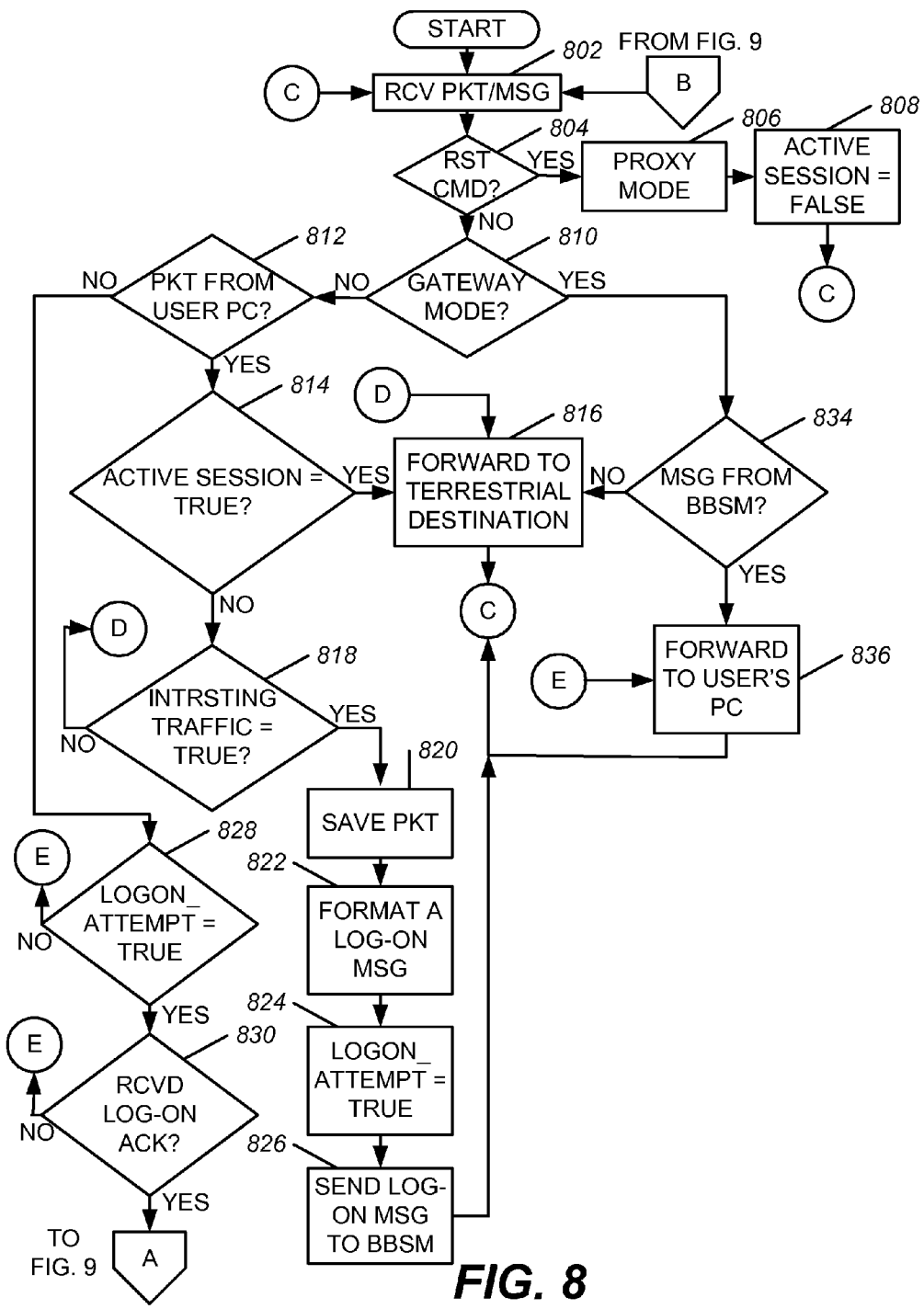
FIGS. 8 and 9 are flowcharts illustrating exemplary processing with respect to a broadband service manager connection process, in embodiments consistent with the subject matter of this disclosure.
Figure 9:
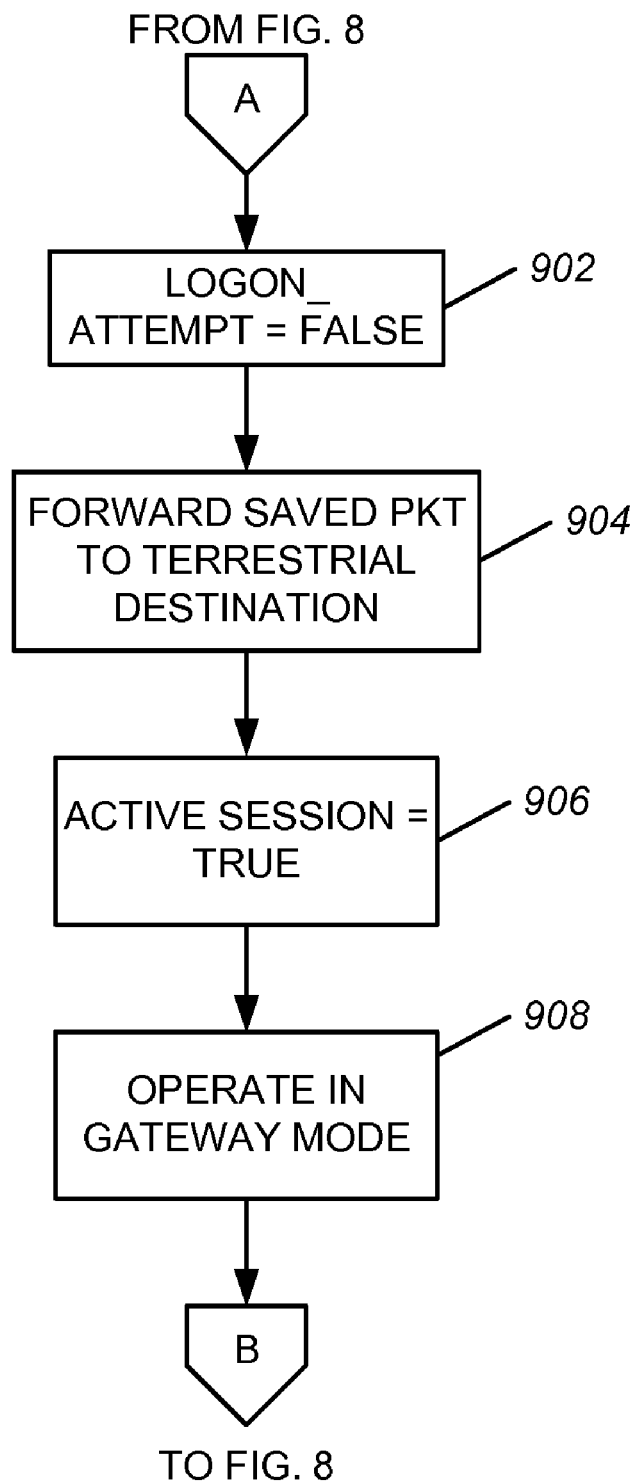

FIGS. 8 and 9 are flowcharts illustrating exemplary processing with respect to BBSM connection process 410, which may be implemented by aircraft processing device 110. The process may begin by receiving a packet originating from a user processing device, or by receiving a message from the BBSM (act 802). BBSM connection process 410 may then determine whether the received packet or message is a reset command from packet inspector 404 (act 804). If a reset command is detected, then BBSM connection process 410 may be set to proxy mode (act 806) and active session flag may be set to false to indicate no active BBSM session (act 808). In proxy mode, BBSM connection process 410 may perform a BBSM authentication/logon process for the user processing device. BBSM connection process 410 may then perform act 802 again.

If, during act 804, the received packet or message is determined to not be a reset command, then BBSM connection process 410 may determine whether BBSM connection process 410 is in gateway mode (act 810). In gateway mode all user processing device traffic may be forwarded to terrestrial destinations via the BBSM.

If, during act 810, BBSM connection process 410 is determined to not be in the gateway mode, then BBSM connection process 410 may be assumed to be in the proxy mode. BBSM connection process 410 may then determine whether the received packet or message is a packet from the user processing device (act 812). If the received packet or message is determined to be a received packet from the user processing device, then BBSM connection process 410 may determine whether active session flag is set to true, indicating an active BBSM session (act 814). If the active session flag is set to true, BBSM connection process 410 may forward the received packet to a terrestrial destination via the BBSM (act 816) and act 802 may again be performed to receive another packet or message.

If, during act 814, the active session flag is determined not to be true, indicating no active BBSM session, then BBSM connection process 410 may determine whether the interesting traffic flag is set to true by packet inspector 404, indicating receipt of interesting traffic (traffic meeting the certain criteria) (act 818). If BBSM connection process 410 determines that the interesting traffic flag is not set to true, then BBSM connection process 410 may again perform acts 816 and 802 to forward a received packet from the user processing device to the terrestrial destination and receive another packet or message.

If, during act 818, BBSM connection process 410 determines that the interesting traffic flag is set to true, then BBSM connection process 410 may save the received packet from the user processing device (act 820), may format a BBSM logon message (act 822), may set a logon attempt flag to true to indicate that a BBSM logon attempt is in progress (act 824), and may send the BBSM logon message to the BBSM (act 826). BBSM connection process 410 may then perform act 802 to receive a next packet or message.

If, during act 812, BBSM connection process 410 determines that a received packet from the user processing device was not received, then BBSM connection process 410 may assume that a BBSM message from the BBSM was received. BBSM connection process 410 may then determine whether logon attempt flag is set to true, indicating that a BBSM logon attempt is in progress (act 828). If the logon attempt flag is not set to true, then the received BBSM message may be forwarded to the user processing device (act 836) and act 802 may again be performed to receive a next packet or message.

If, during act 828, the logon attempt flag is determined to be set to true, then BBSM connection process 410 may determine whether the received BBSM message is a logon acknowledgment (act 830). If the received BBSM message is determined not to be a logon acknowledgment, then acts 836 and 810 may again be performed to forward the received BBSM message to the user processing device and to receive a next packet or message, respectively. Otherwise, BBSM connection process 410 may reset the logon attempt flag to false (act 902; FIG. 9), may forward the saved packet (saved during act 820) to the terrestrial destination (act 904), may set the active session flag to true to indicate existence of an active session (act 906), and may set BBSM connection process 410 to be in gateway mode (act 908).

BBSM connection process 410 may again perform act 802 to receive a next packet or message.

If an RF link from aircraft 502 to a ground earth station is no longer available for a short period of time, a BBSM connection session may recover with no impact once the RF link is restored. If the RF link from aircraft 502 to the ground earth station is no longer available for a long period of time, the BBSM connection session may timeout and become disconnected. As a result, an attempt to send a BBSM message to the ground earth station may result in a message being returned indicating that there is no current valid connection session. BBSM connection process 410 may wait for an occurrence of interesting traffic before initiating the BBSM authentication/logon process. BBSM connection process 410 may not initiate the BBSM authentication/logon process based solely upon receiving a BBSM logon request from the BBSM.

Returning to FIG. 8, if, during act 810, BBSM connection process 410 determines that BBSM connection process 410 is in gateway mode, then BBSM connection process 410 may determine whether the received packet or message is from the BBSM (act 834). If the received packet or message is not from the BBSM, then the received packet or message may be forwarded to the terrestrial destination (act 816). Otherwise, the received packet or message may be forwarded to the user processing device (act 836). Act 802 may again be performed to receive a next packet or message.

Link Switch Process

Figure 10:
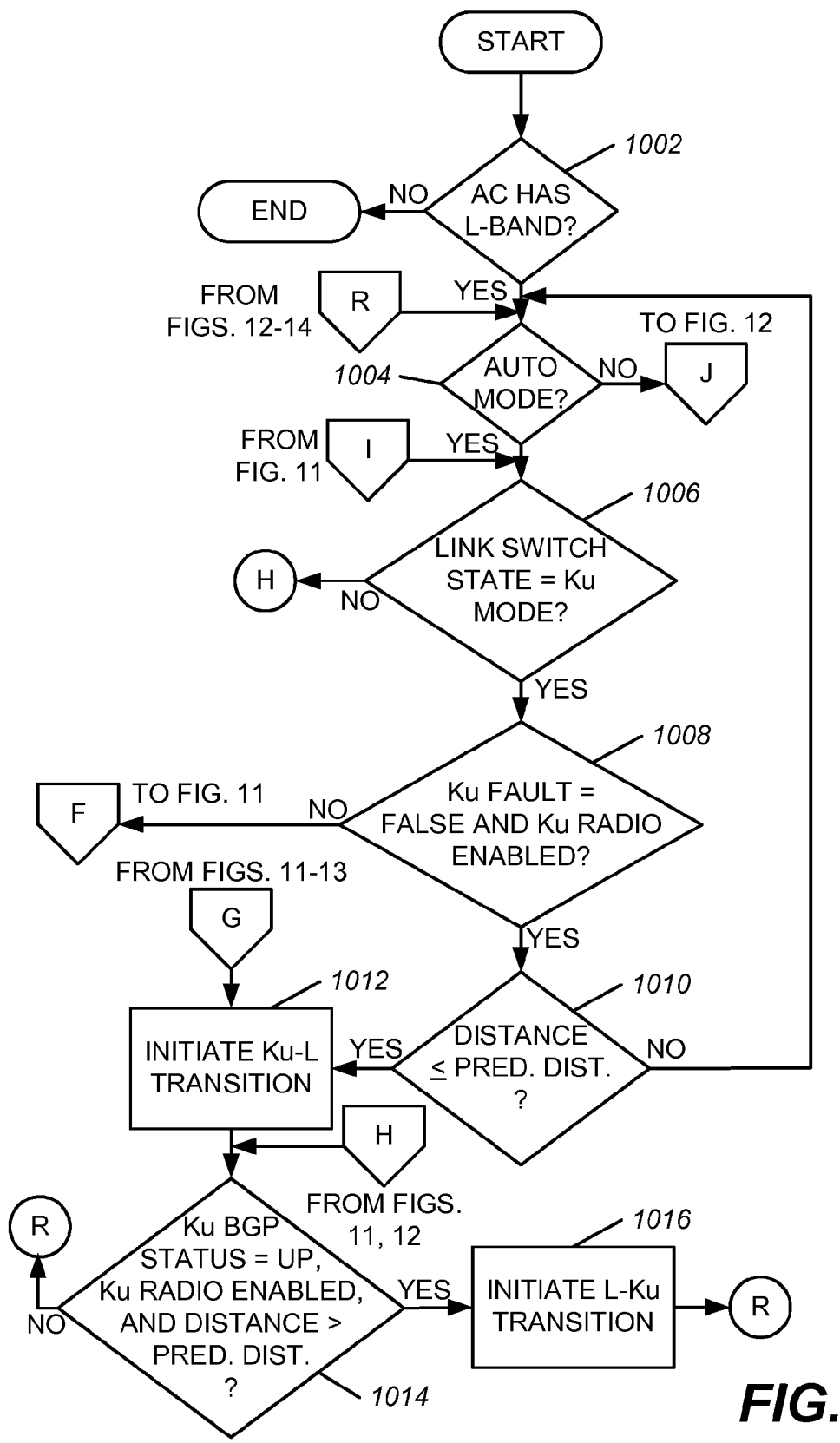
FIGS. 10-14 are flowcharts illustrating exemplary processing with respect to a link switch process, in embodiments consistent with the subject matter of this disclosure.

FIG. 10 is a flowchart illustrating an exemplary processing with respect to link switch process 414. The process may begin with aircraft processing device 110 determining whether an aircraft is capable of communicating with an L-band communication satellite (act 1002). If aircraft processing device 110 determines that the aircraft is not capable of communicating with an L-band communication satellite, then the process may end.

If aircraft processing device 110 determines that the aircraft is capable of communicating with an L-band communication satellite, then aircraft processing device 110 may determine whether to operate in auto mode (act 1004). In this embodiment, when operating in auto mode, aircraft processing device 110 may attempt to communicate with a Ku-band communication satellite when one is available. Otherwise, aircraft processing device 110 may attempt to communicate with an L-band communication satellite.

If, during act 1004, aircraft processing device 110 determines that aircraft processing device 110 is to operate in auto mode, then aircraft processing device 110 may determine whether aircraft processing device 110 is now in a state in which aircraft processing device 110 is to communicate with a Ku-band communication satellite (act 1006). If aircraft processing device 110 used to communicate with a Ku-band communication satellite, then aircraft processing device 110 may determine whether a Ku fault flag is set to false (indicating that no Ku fault currently exists) and whether a Ku radio is enabled (act 1008). If the Ku fault flag is set to false and the Ku radio is enabled, then aircraft processing device 110 may communicate with Ku-band terminal 116 to determine whether a distance remaining in a current Ku-band communication region is less than or equal to a predefined distance, such as, for example, 33 miles, or another suitable predefined distance (act 1010). If the distance remaining in the current Ku-band communication region is determined to be not less than or equal to the predefined distance, then aircraft processing device 110 may again perform act 1004.

If, during act 1010, the distance remaining in the current Ku-band communication region is determined to be less than or equal to the predetermined distance, then aircraft processing device may initiate a process for transitioning from Ku-band to L-band communication (act 1012).

Figure 15:
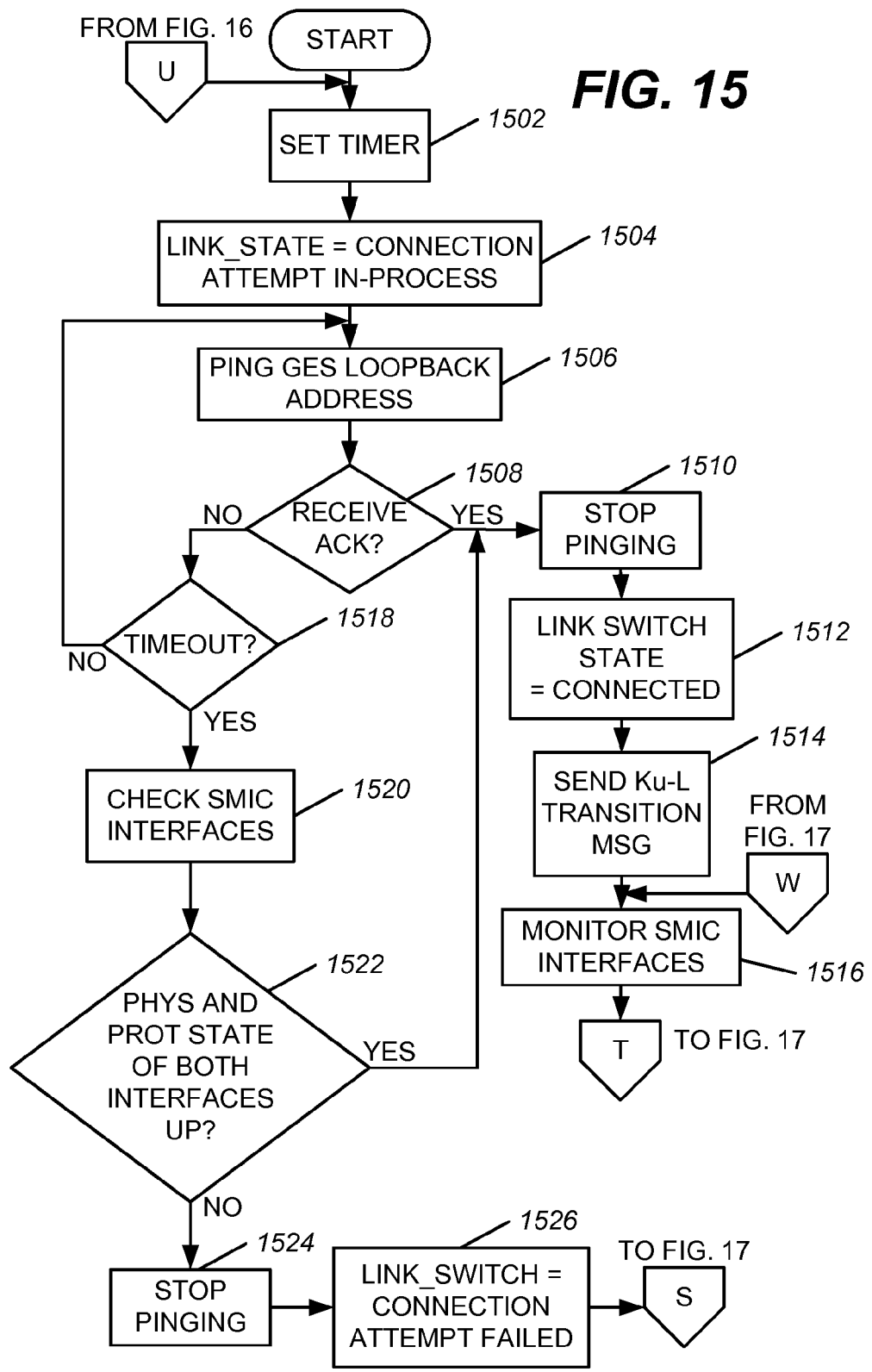
FIGS. 15-17 are flowcharts illustrating exemplary processing with respect to a process for initiating a Ku-L transition, in embodiments consistent with the subject matter of this disclosure.
Figure 16:
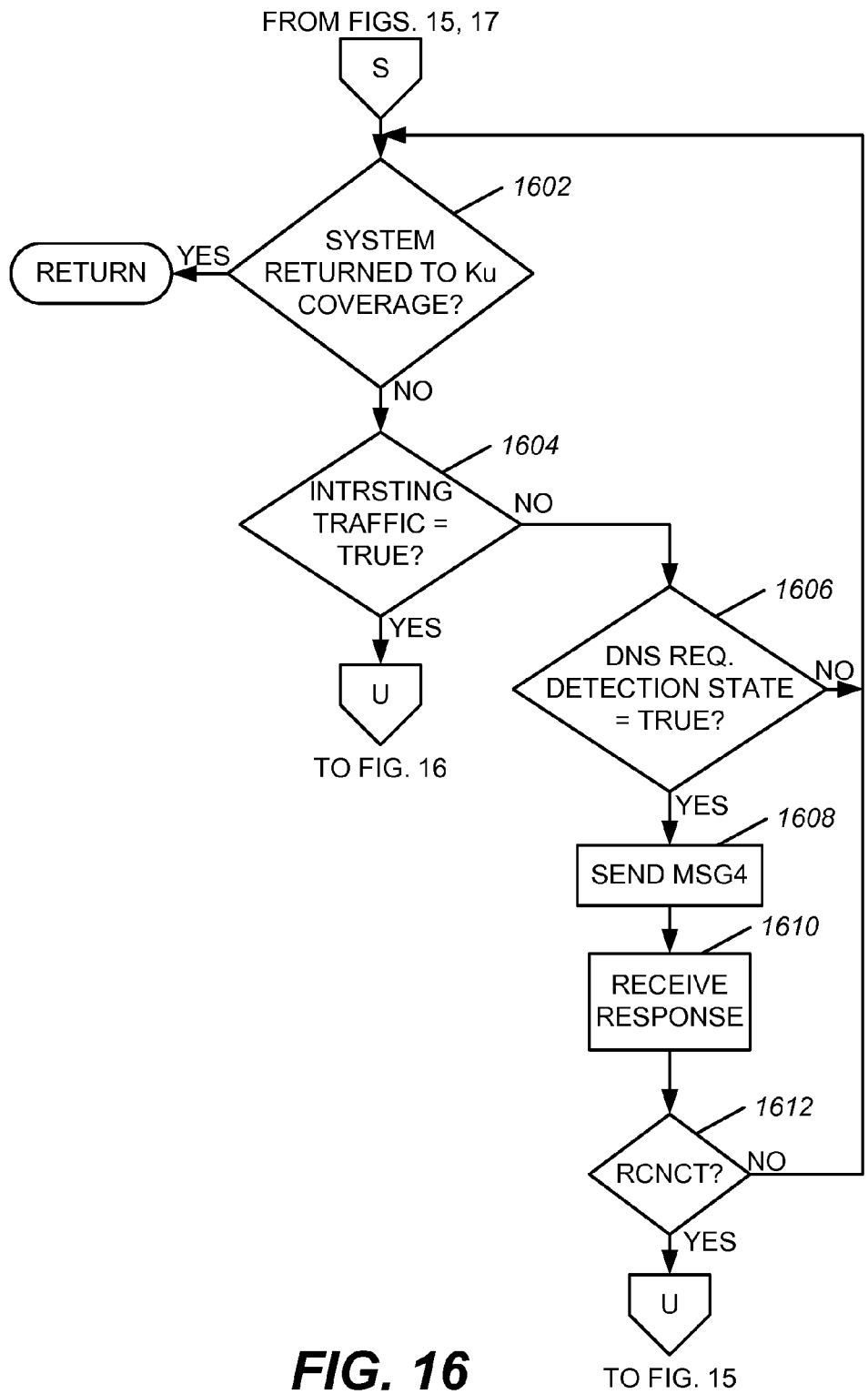
Figure 17:
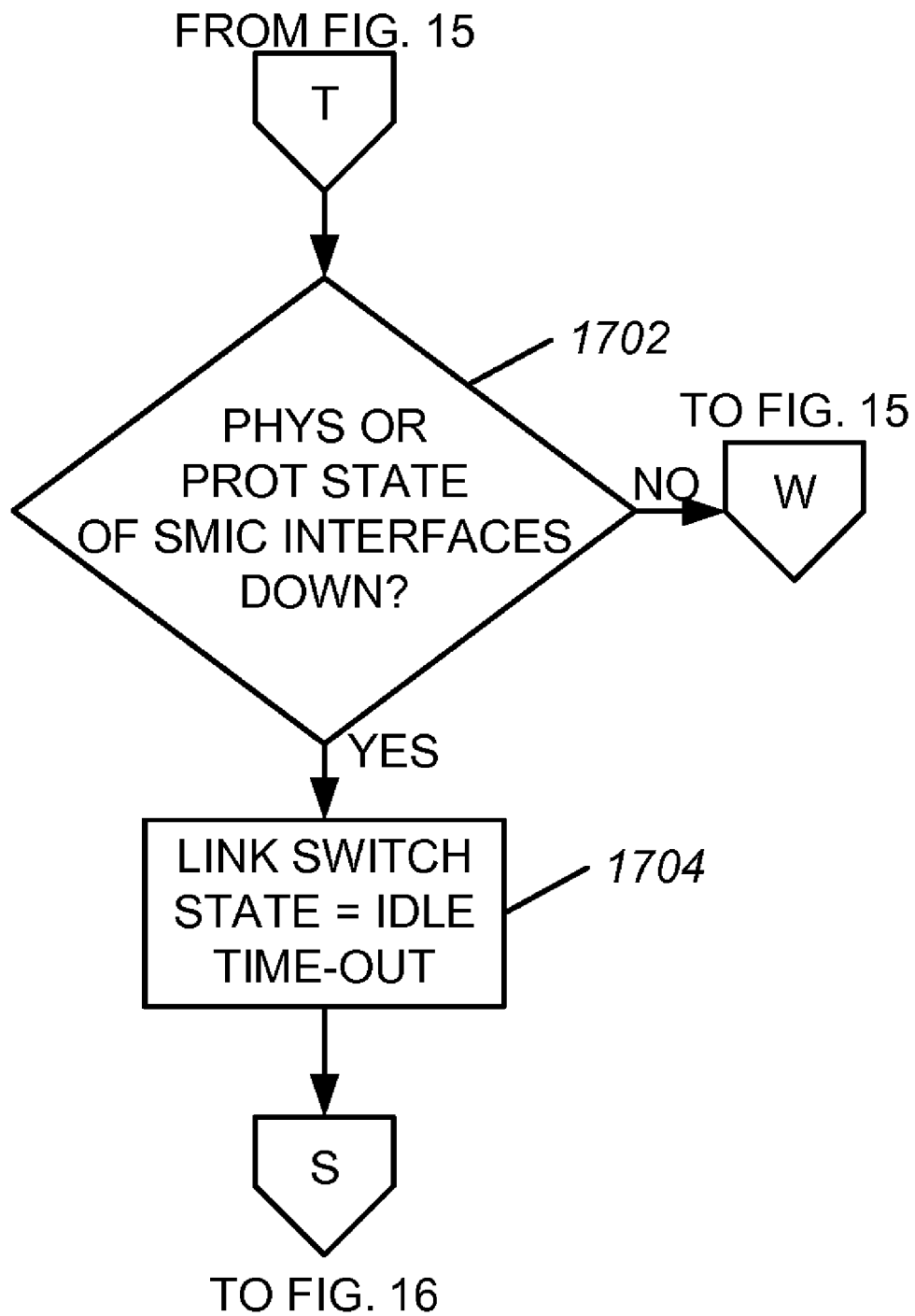

FIGS. 15-17 illustrate an exemplary process for transitioning from Ku-band to L-band communication. The process may begin with aircraft processing device 110 setting a timer (act 1502). The timer may be set for a predetermined time period, such as, for example, 180 seconds, 240 seconds, or another suitable time period.

Next, aircraft processing device 110 may then set a link switch state to "connection attempt in-process", indicating an attempt to establish an L-band connection (act 1504). Aircraft processing device 110 may then ping a ground earth station loopback address (act 1506). If the ping is received by the ground earth station loopback address, then an acknowledgment may be sent to the aircraft. Aircraft processing device 110 may then determine whether the acknowledgment is received (act 1508).

If aircraft processing device 110 determines that the acknowledgment is received, then aircraft processing device 110 may stop pinging the ground earth station loopback address (act 1510). The link switch state may then be set to "connected" to indicate that an L-band connection exists between the aircraft and a ground earth station (act 1512). Aircraft processing device 110 may then send a message to a user processing device, via user message process 408, to inform the user that communication has transitioned from a Ku-band communication satellite to an L-band communication satellite (act 1514). Aircraft processing device 110 may then monitor serial mobile interface card (SMIC) interfaces (act 1516).

Aircraft processing device 110 may then determine whether a physical state or a protocol state of the SMIC interfaces is down (act 1702; FIG. 17). If neither the physical state nor the protocol state of the SMIC interfaces are down, then aircraft processing device 110 may continue to monitor the SMIC interfaces (act 1516; FIG. 15). Otherwise, the link switch state may be set to "idle time-out" to indicate that MAR 114 timed out waiting for interesting traffic (act 1704; FIG. 17).

Aircraft processing device 110 may then determine whether communication has returned to Ku-band communication (act 1602; FIG. 16). If so, the process is completed. Otherwise, aircraft processing device 110 may determine whether the interesting traffic flag was set to true by packet inspector 404 (act 1604; FIG. 16).

If the interesting traffic flag is determined not to be set to true, then aircraft processing device 110 may determine whether the DNS request detection state was set to true by packet inspector 104, indicating that a DNS request was detected by packet inspector 104 (act 1606). If DNS request detection state was not set to true, then act 1602 may be performed to determine whether communication returned to the Ku band.

If, during act 1606, aircraft processing device 110 determines that the DNS request detection state is set to true, then user message process 408 may be called upon to send message4 to the user processing device (act 1608). In this exemplary embodiment, message4 may be a message informing a user that the L-band connection has gone idle and asking the user whether the user wishes to reconnect via the L-band connection.

Aircraft processing device 110 may then receive a response from the user via a user message process 408 (act 1610). Aircraft processing device 110 may then determine whether the user's response indicates a desire to reconnect the L-band connection (act 1612). If not, aircraft processing device 110 may again perform at 1602.

If, during act 1604, aircraft processing device 110 determines that the interesting traffic flag is set to true, or during act 1612, aircraft processing device 110 determines that the user desires to reconnect via the L-band connection, then the aircraft processing device may again perform act 1502 (FIG. 15).

Returning to FIG. 15, if, during act 1508, aircraft processing device 110 determines that an acknowledgment from the ground earth station is not received, then aircraft processing device 110 may determine whether a timeout occurred while waiting for the acknowledgment (act 1518). If the timeout did not occur, then aircraft processing device 110 may again perform acts 1506 and 1508. Otherwise, aircraft processing device 110 may check the SMIC interfaces (act 1520). If the physical state and the protocol state of the SMIC interfaces are determined to be up, then act 1510 may again be performed. If either the physical state or the protocol state of the SMIC interfaces is down, then aircraft processing device 110 may stop pinging the ground earth station loopback address (act 1524). Aircraft processing device 110 may then set the link switch state to "connection attempt failed" (act 1526). Aircraft processing device 110 may then again perform act 1602 (FIG. 16).

Returning to FIG. 10 aircraft processing device may then determine whether a Ku BGP status is up, the Ku radio is enabled, and the distance remaining in the Ku coverage area is greater than the predetermined distance (act 1014; FIG. 10). If any of the conditions are determined to be false, then aircraft processing device 110 may perform act 1004 to determine whether operation is in auto mode. Otherwise, aircraft processing device 110 may initiate a transition from L-band operation to Ku-band operation (act 1016). Aircraft processing device 110 may then perform act 1004 to determine whether operation is in auto mode.

Figure 18:
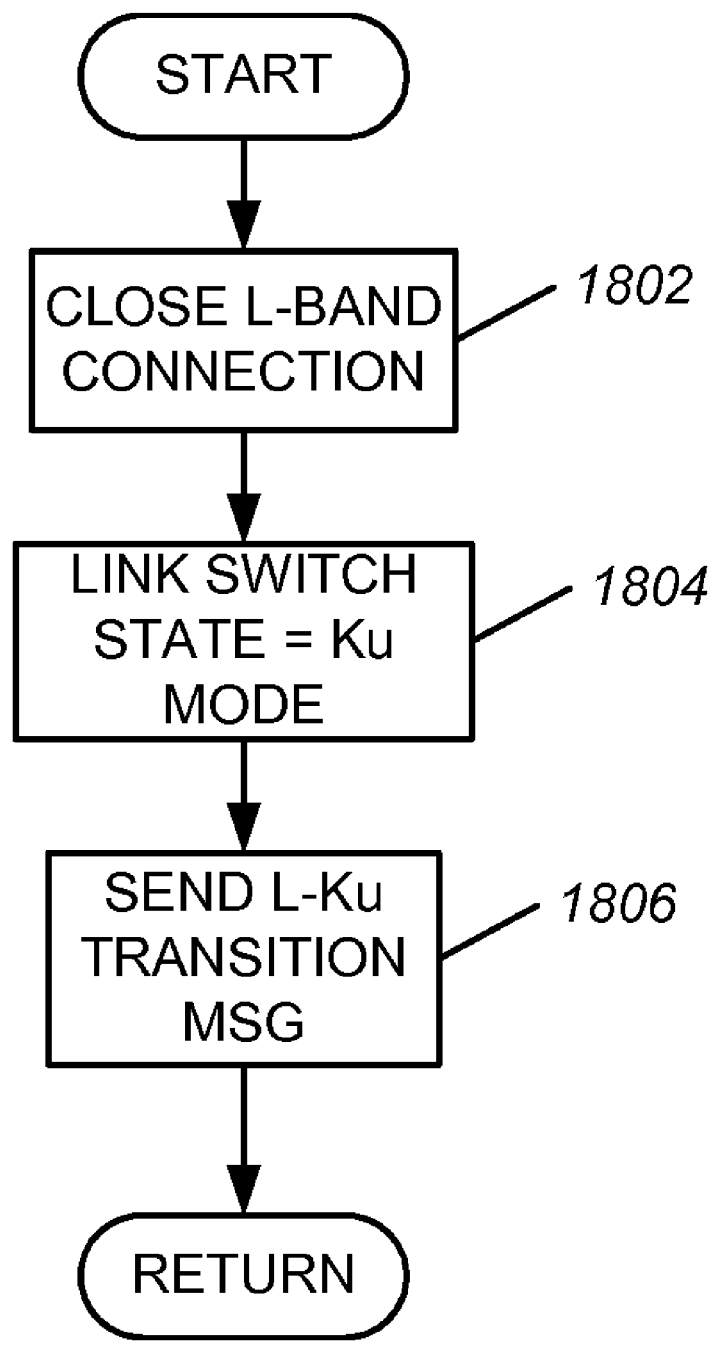
FIG. 18 is a flowchart illustrating exemplary processing with respect to a process for initiating a Ku-L transition, in embodiments consistent with the subject matter of this disclosure.

FIG. 18 illustrates exemplary processing with respect to transitioning from L-band operation to Ku-band operation. The process may begin with aircraft processing device 110 closing the L-band connection (act 1802). In some embodiments, aircraft processing device 110 may close the L-band connection by resetting a MAR interface via a command, such as, for example, a system network management protocol (SNMP) command, or other type of command. Aircraft processing device 110 may then set the link switch state to indicate Ku-band operation (act 1804). Aircraft processing device 110 may then send a message, via user message process 408, to the user's processing to indicate that the connection has transitioned from the L-band to the Ku-band (act 1806).

Returning to FIG. 10, aircraft processing device 110 may then perform act 1004 to determine whether aircraft processing device 110 is operating in auto mode.

Figure 11:
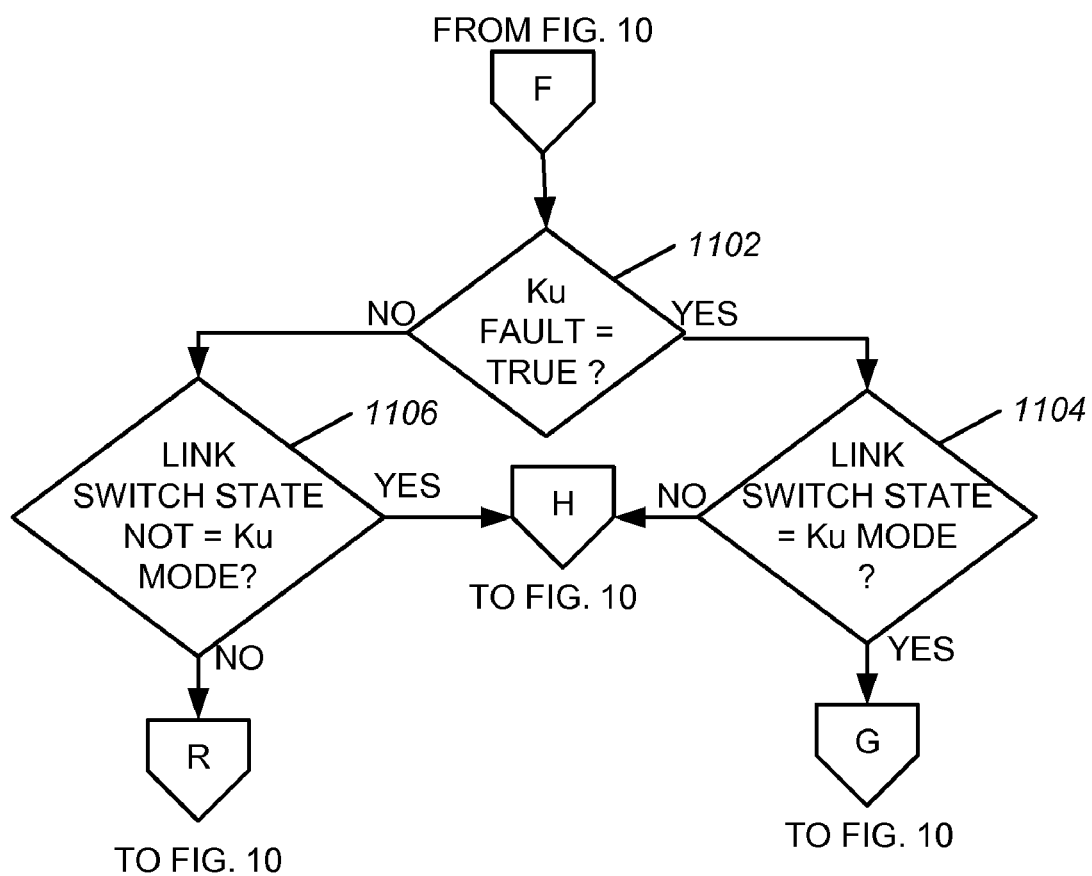

If, during act 1008, aircraft processing device 110 determines that either Ku fault is set to true or the Ku radio is not enabled, then aircraft processing device 110 may determine whether the Ku fault is set to true, indicating a problem with Ku communications (act 1102; FIG. 11). If the Ku fault is set to true, then aircraft processing device 110 may determine whether the link switch state currently indicates Ku band operation (act 1104). If the link switch state indicates Ku-band operation, then aircraft processing device may again perform act 1012 to initiate a transition from Ku-ban to L-band (FIG. 10). Otherwise, aircraft processing device may again perform act 1014.

If, during act 1102, the Ku fault is not set to true, then aircraft processing device 110 may determine whether the link switch state indicates non-Ku band operation (act 1106). If the link switch state indicates non-Ku band operation, then aircraft processing device may again perform act 1014 (FIG. 10). Otherwise, aircraft processing device 110 may again perform act 1004.

Figure 12:
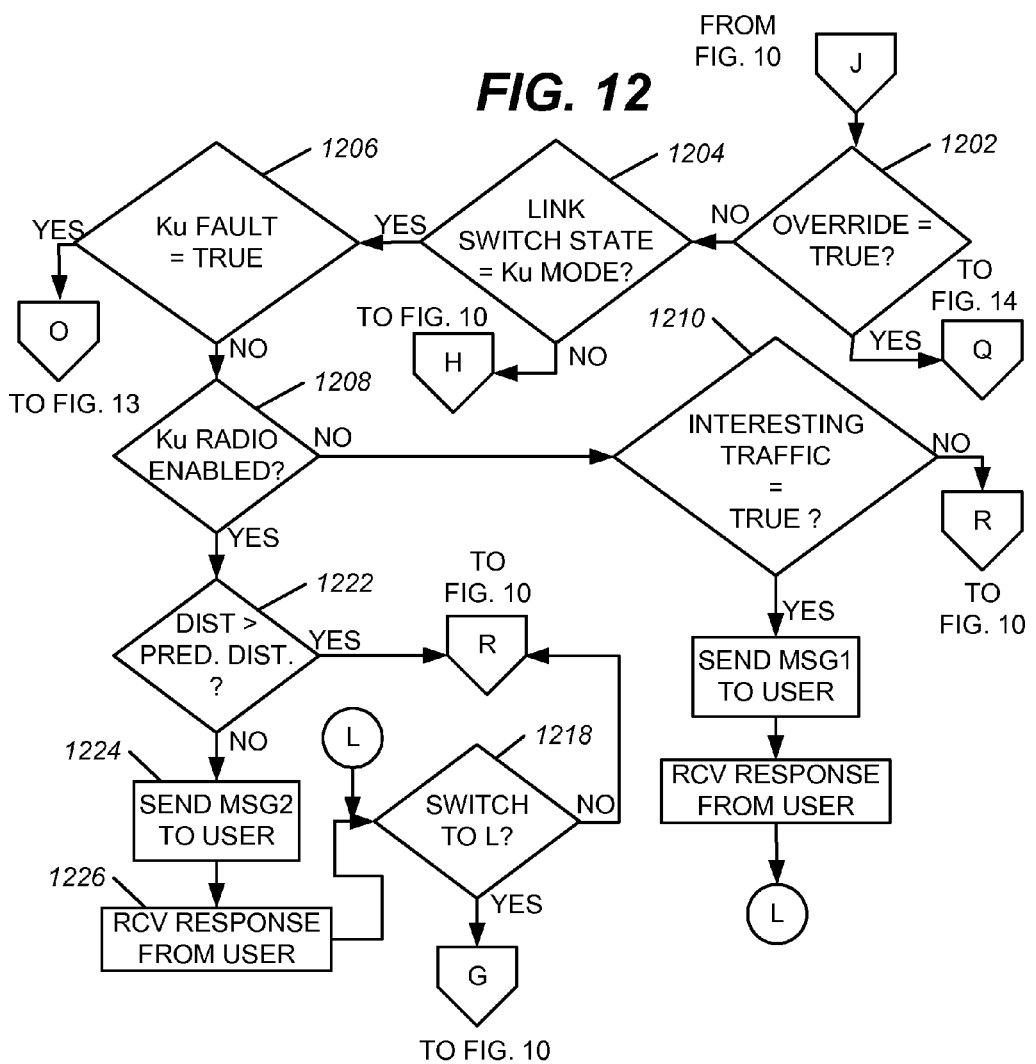
Figure 13:
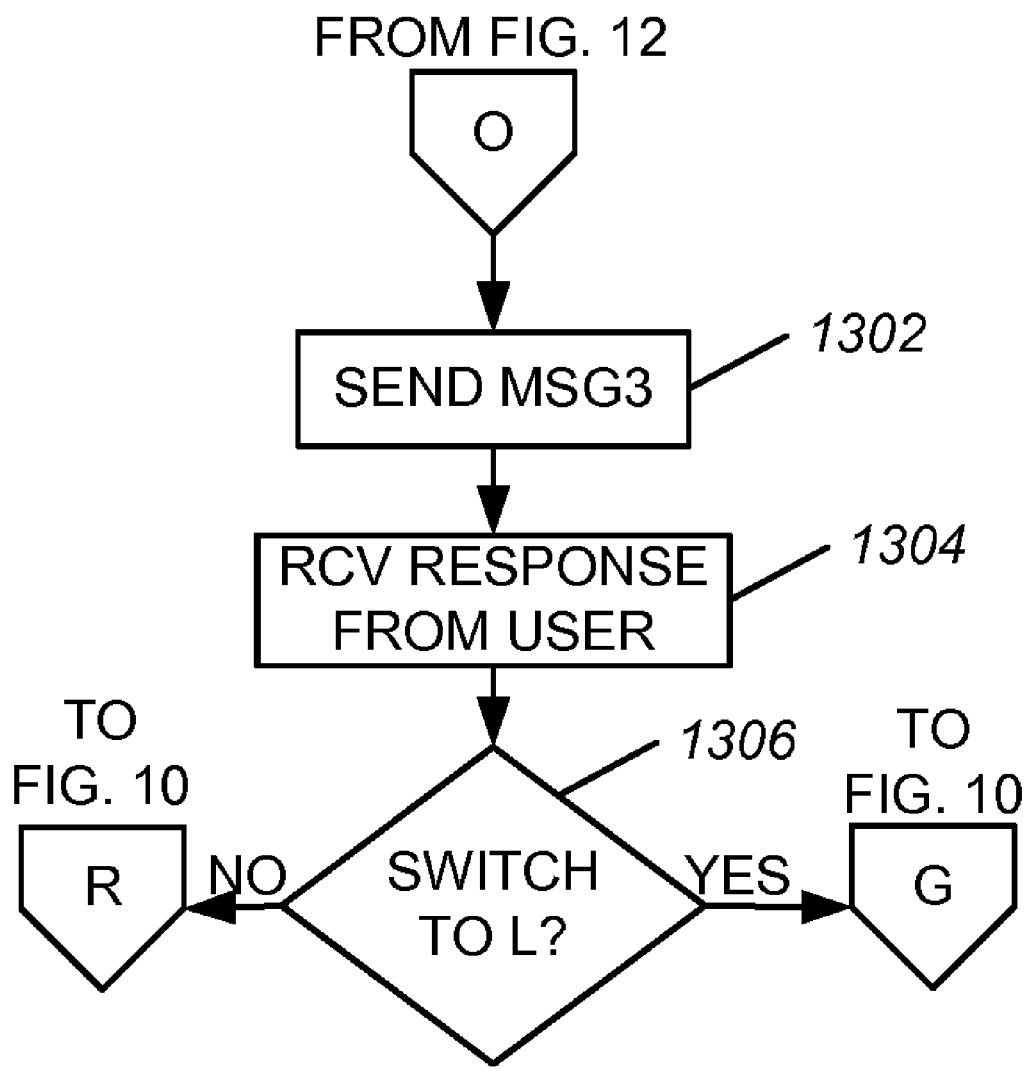

If, during act 1004, a determination is made that operation is not in auto mode, then aircraft processing device 110 may assume that operation is in manual mode and aircraft processing device 110 may determine whether operation is in manual override mode (act 1202; FIG. 12). If operation is not in manual override mode, then aircraft processing device 110 may determine whether the link switch state indicates Ku-band communication mode (act 1204). If the link switch state indicates a communication mode other than Ku band, then aircraft processing device 110 may perform act 1014, which was described above.

If the link switch state indicates Ku band communication mode, then aircraft processing device 110 may determine whether Ku fault is set to true, indicating a Ku communication problem (act 1206). If Ku fault is set to true, then aircraft processing device may determine whether the Ku radio is enabled (act 1208). If the Ku radio is not enabled, then aircraft processing device may determine whether the interesting traffic flag is set to true by packet inspector 404 (act 1210). If the interesting traffic flag is not set to true, then aircraft processing device may perform act 1004 (FIG. 10).

If the interesting traffic flag is set to true, then, aircraft processing device 110 may send message1 to the user processing device via user message process 408 (act 1214; FIG. 12). In this embodiment, message1 may be a message informing the user that the aircraft is not in a Ku-band coverage area, that the aircraft has L-band communication capability, and that automatic transition to L-band communication is inhibited. Message1 further may request the user to indicate whether the user desires to establish an L-band connection.

Aircraft processing device 110 may then receive a response from the user via user message process 408 (act 1216). Aircraft processing device 110 may then determine whether the user indicated a desire to establish an L-band connection (act 1218). If the user indicated no desire to establish an L-band connection, then aircraft processing device 110 may perform act 1004 (FIG. 10). Otherwise, aircraft processing device 110 may initiate a transition from Ku band to L band (act 1012; FIG. 10). Aircraft processing device 110 may then perform act 1014.

If, during act 1208, aircraft processing device 110 determines that the Ku radio is enabled, then aircraft processing device may determine whether a distance remaining in a Ku coverage area is greater than a second predetermined distance, such as, for example, 50 miles or another suitable distance (act 1222; FIG. 12). If the distance remaining is determined to be greater than the second predetermined distance, then aircraft processing device 110 may again perform act 1004 (FIG. 10). Otherwise, aircraft processing device 110 may send message2 to the user processing device via a user message process 408 (act 1224; FIG. 12). In this embodiment, message2 indicates to the user that the aircraft is about to leave a Ku-band coverage area, that the aircraft has L-band communication capability, and that automatic transition to L-band communication is inhibited. Message2 further may request the user to indicate whether the user desires to connect to an L-band connection once Ku-band coverage is lost. Aircraft processing device 110 may then receive a response from the user via a user message process 408 (act 1226). Aircraft processing device may then perform act 1218.

If, during act 1206, aircraft processing device 110 determines that Ku fault is set to true, then aircraft processing device 110 may send message3 to the user processing device via user message process 408 (act 1302). In this embodiment, message3 may inform the user that Ku-connectivity has been lost due to a system fault, that the aircraft is capable of L-band communication, and that automatic transition to L-band communication has been inhibited. Aircraft processing device 110 may then receive a response from the user, via a user message process 408, indicating whether the user desires to establish an L-band connection (act 1304). Aircraft processing device 110 may then determine whether the user indicated a desire to establish an L-band connection (act 1306). If the user indicated that an L-band connection is desired, then aircraft processing device 110 may perform act 1012 (FIG. 10) to initiate a transition from Ku band to L band. Otherwise, aircraft processing device may perform act 1004 (FIG. 10) to determine whether operation in auto mode.

Figure 14:
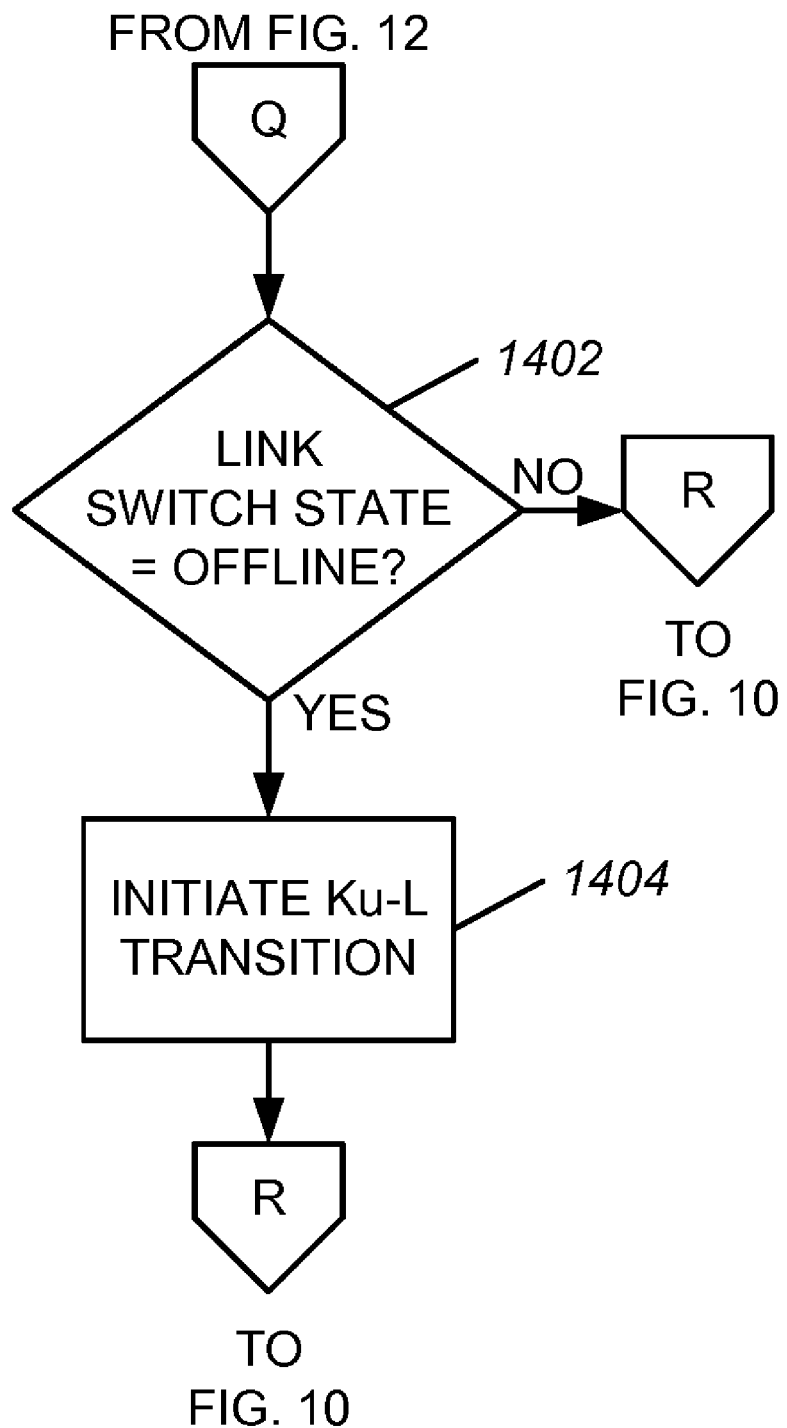

If, during act 1202, aircraft processing device determines that operation is to be in manual override mode, then aircraft processing device 110 may determine whether the link switch state indicates Ku-band communication mode (act 1402; FIG. 14). If the link switch state does not indicate Ku band communication mode, then aircraft processing device 110 may perform act 1004 (FIG. 10). Otherwise, aircraft processing device 110 may initiate a transition from Ku band to L band (act 1404; FIG. 14). Aircraft processing device 110 may then perform act 1004 (FIG. 10).

MAR Process

Figure 19:
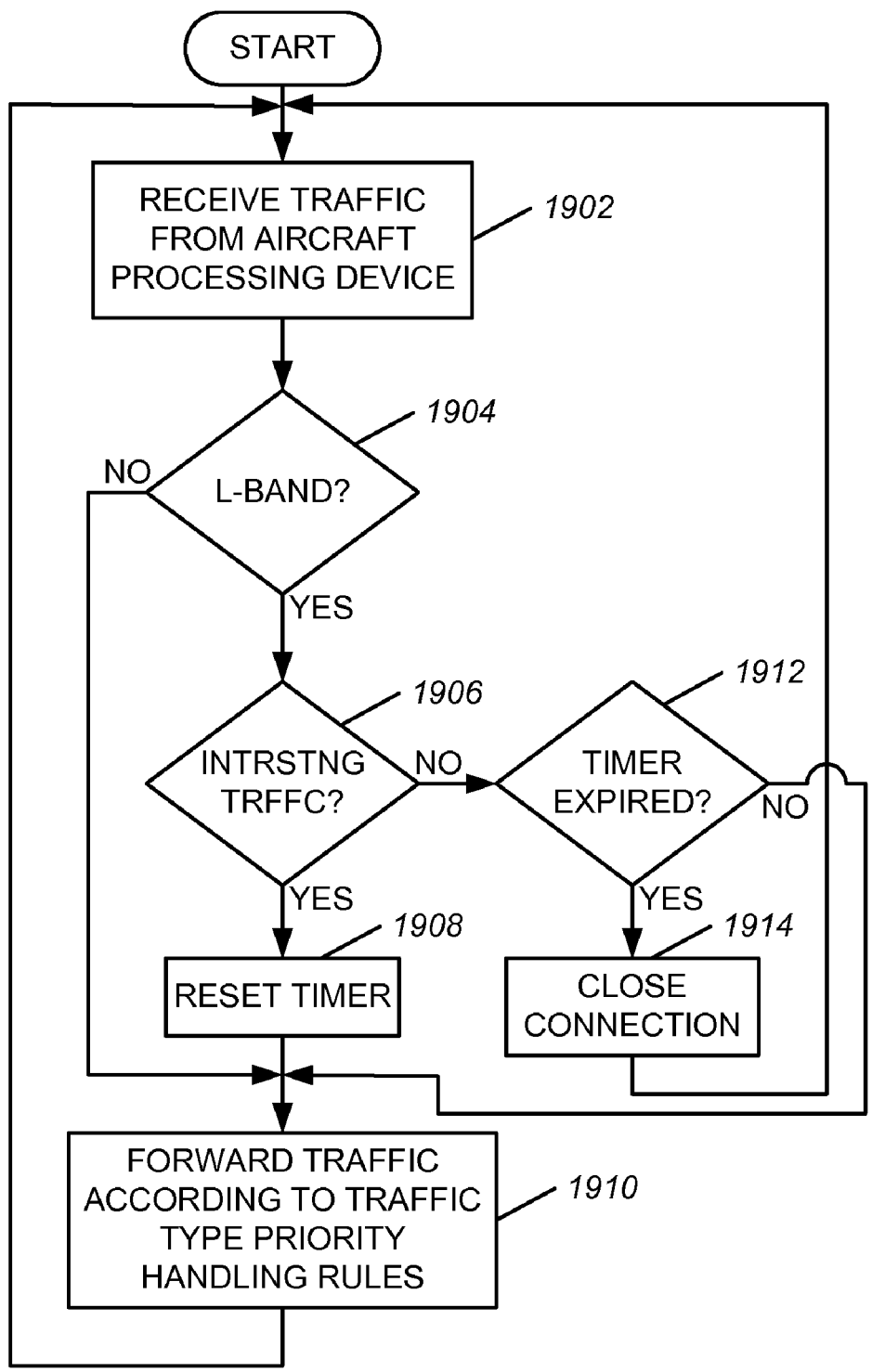
FIG. 19 is a flowchart illustrating exemplary processing with respect to a mobile access router process, in embodiments consistent with the subject matter of this disclosure.

FIG. 19 is a flowchart illustrating exemplary processing with respect to MAR process 416. The process may begin by receiving traffic from aircraft processing device 110 (act 1902). A determination may then be made regarding whether communication is occurring in L-band (act 1904). If communication is occurring in L-band, then MAR process 416 may determine whether interesting traffic has been observed according to an L-band interesting traffic list 418 (act 1906). In some embodiments, the L-band interesting traffic list may be configured to match an interesting traffic list used by packet inspector 404. If MAR process 416 determines that interesting traffic has been observed, then a timer may be reset (act 1908). MAR process 416 may then forward the received traffic according to predefined traffic type priority handling rules (act 1910).

If, during act 1904, communication is determined to not be occurring in L-band, then act 2010 may be performed.

If, during act 1906, interesting traffic has not been observed, then the timer may be checked to determine whether the timer expired (act 1912). If the timer expired, then the L-band connection may be closed (act 1919) and act 1902 may again be performed.

In various embodiments, the timer may be set to 180 seconds, 240 seconds, or another suitable time period. Further, for voice communications, only actual VoIP traffic may be considered to be interesting traffic, thereby causing the timer to be reset when VoIP is detected. Command and control packets, with respect to voice communication, may not be considered interesting traffic. Therefore, actual VoIP traffic may keep the L-band connection established. Once the timer expires and the connection is closed, command and control packets for voice communication may not cause and L-band connection to be reestablished.

Miscellaneous

Although the above-described embodiments describe a system and method by which aircraft-to-ground communication may seamlessly transition for a first communication satellite to a second communication satellite, embodiments consistent with the subject matter of this disclosure may also include systems and methods by which other types of communication, such as, for example, aircraft-to-aircraft communication, aircraft-to-land (fixed and mobile) communication, aircraft-to-sea (fixed and mobile) communication, and other types of communication may seamlessly transition from a communication satellite to another communication satellite, or vice versa. The other communication medium may include a second communication satellite communicating via a second communication band, wireless fidelity (WiFi) communication, high frequency (HF) communication, ultra-high frequency (UHF) communication, or other communication medium. Further, the above-described embodiments included SMIC interfaces, which may be employed when using an ISDN connection. In other embodiments, other interfaces may be employed, such as, for example, interfaces used with an Ethernet, or other type of connection.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. An apparatus for use aboard an aircraft for maintaining an air-to-ground network connection between a processing device, aboard the aircraft, and a second processing device, at a terrestrial location, the apparatus comprising:
a packet inspector to inspect a packet destined for the processing device or received from the processing device to detect whether the packet satisfies certain criteria;
a service manager connection component to log the processing device onto the second processing device via the air-to-ground network connection when the processing device is not logged onto the second processing device and the packet inspector detects the packet satisfying the certain criteria; and
a switch component for detecting an approaching end of a satellite region for a satellite currently handling communications for the air-to-ground network connection and for making a transition from the satellite to a second satellite such that the air-to-ground network connection is seamlessly maintained,
wherein the satellite operates using a first communication band and the second satellite operates using a second communication band, and when a VoIP call is connected from the processing device via the second satellite, the apparatus maintains the VoIP call as long as a VoIP data packet is received or sent before a predetermined time interval expires.

2. The apparatus of claim 1, wherein a connection over which the first processing device is logged onto the second processing device is closed when a predetermined period of time passes during which a packet or message satisfying the certain criteria is not received or sent via the connection.

3. The apparatus of claim 1, wherein the switch component causes the apparatus to communicate using the first communication band, when possible, and to automatically prepare to communicate using the second communication band when the apparatus cannot connect to, or in a predetermined time period will be unable to connect to a satellite using the first communication band, when in a first mode of operation.

4. The apparatus of claim 1, wherein the switch component causes the apparatus to communicate using the first communication band, when possible, and to prepare to communicate using the second communication band when the apparatus cannot connect to, or after travelling a predetermined distance will be unable to connect to a satellite using the first communication band, and a user indicates a desire for the apparatus to communicate using the second communication band, when in a second mode of operation.

5. A machine-implemented method for seamlessly maintaining a connection from a first processing device, aboard an aircraft, to a second processing device, at a terrestrial location, via an air-to-ground network connection, the machine-implemented method comprising:
automatically logging a first processing device onto a service manager, via the air-to-ground connection, when a packet or message is detected as being received from the first processing device and the first processing device is not already logged onto the service manager;
passing traffic between the first processing device and the second processing device via the air-to-ground network connection;
detecting an approaching end of a satellite region of a satellite through which the traffic of the air-to-ground network passes;
seamlessly transitioning the air-to-ground network connection from the satellite to a second communication medium; and
keeping a VoIP call open when the VoIP call is connected from the first processing device to the second processing device via the second communication medium as long as a VoIP data packet is received or sent before a predetermined time interval expires.

6. The machine-implemented method of claim 5, wherein:
the automatically logging onto the service manager occurs when a packet satisfying certain criteria is received from the first processing device and no active session exists with respect to the first processing device and the service manager.

7. The machine-implemented method of claim 5, wherein:
the satellite communicates via a first frequency range and not via a second frequency range,
the second communication medium communicates via the second frequency range and not via the first frequency range, and the seamless transitioning of the air-to-ground network connection from the satellite to the second communication medium occurs automatically in an automatic mode of operation.

8. The machine-implemented method of claim 5, wherein:

the satellite communicates via a first frequency range and not via a second frequency range, the second communication medium communicates via the second frequency range and not via the first frequency range, and the seamless transitioning of the air-to-ground network connection from the satellite to the second communication medium occurs only when a user of the first processing device indicates a desire to transition to the second communication medium, when in a manual mode of operation.

9. The machine-implemented method of claim 5, wherein:

the satellite communicates via a first frequency range and not via a second frequency range, the second communication medium communicates via the second frequency range and not via the first frequency range, and the seamless transitioning of the air-to-ground network connection from the satellite to the second communication medium occurs only when not operating in a manual override mode of operation.

* * * * *